US007231576B2

(12) United States Patent
Tanaka et al.

(10) Patent No.: US 7,231,576 B2
(45) Date of Patent: Jun. 12, 2007

(54) REPRODUCTION APPARATUS AND METHOD FOR REPRODUCING A COMPOSITE CODED DATA PIECE

(75) Inventors: Hisae Tanaka, Osaka (JP); Yoshikazu Yamamoto, Osaka (JP); Motoshi Ito, Osaka (JP)

(73) Assignee: Matsushita Electric Industrial Co., Ltd., Kadoma (JP)

( * ) Notice: Subject to any disclaimer, the term of this patent is extended or adjusted under 35 U.S.C. 154(b) by 621 days.

(21) Appl. No.: 10/655,468

(22) Filed: Sep. 4, 2003

(65) Prior Publication Data

US 2004/0078746 A1    Apr. 22, 2004

(30) Foreign Application Priority Data

Sep. 27, 2002  (JP) ............................. 2002-283175

(51) Int. Cl.
*H03M 13/00* (2006.01)
(52) U.S. Cl. ..................................... 714/755
(58) Field of Classification Search ............... 714/763, 714/755
See application file for complete search history.

(56) References Cited

U.S. PATENT DOCUMENTS 6,304,994 B1 * 10/2001 Oh et al. .................... 714/784
6,367,049 B1 * 4/2002 Van Dijk et al. ........... 714/761
6,505,320 B1 * 1/2003 Turk et al. .................. 714/755

FOREIGN PATENT DOCUMENTS

JP    2001-515642    4/2002

* cited by examiner

Primary Examiner—Albert Decady
Assistant Examiner—Sam Rizk
(74) Attorney, Agent, or Firm—Renner, Otto, Boisselle & Sklar, LLP

(57) ABSTRACT

A reproduction method includes a step of performing error correction of the first coded data piece and generating error location information which represents an error location of the first coded data; a step of generating erasure locator information which represents an erasure position of the second coded data piece, based on the error location information; and an erasure error correction step of performing erasure error correction of the second coded data piece based on the erasure locator information. The erasure locator information generation step includes the step of, when the error location information indicates that no error is detected in the Nth first symbol and the (N+2)th first symbol and that an error is detected in the (N+1)th first symbol, determining at least one of the plurality of second symbols provided adjacent to the (N+1)th first symbol as representing erasure.

28 Claims, 12 Drawing Sheets

REPRODUCTION APPARATUS AND METHOD FOR REPRODUCING A COMPOSITE CODED DATA PIECE

BACKGROUND OF THE INVENTION

1. Field of the Invention

The present invention relates to an error correction method for correcting an error of composite coded data having at least one second symbol between first symbols forming first coded data which is error-correction-coded using a first error correction code, between synchronization data pieces for synchronizing data, or between the first symbol and the synchronization data, the second symbol forming second coded data which is error-correction-coded using a second error correction code having a lower degree of redundancy than the first error correction code. The present invention also relates to a reproduction apparatus for carrying out such an error correction method.

2. Description of the Related Art

Optical discs which are representative recording mediums have recently increased in density and capacity, and thus require improved reliability. Various error correction methods for correcting errors caused by defects of a recording medium itself or dust or scratches on the recording medium have been proposed (for example, U.S. Pat. No. 6,367,049B1, pages 5 to 6 and FIG. 5; and Japanese National-Phase PCT Laid-Open Publication No. 2001-515642, pages 10 to 11 and FIG. 2).

FIG. 2 shows an exemplary composite coded data piece 203, together with a first coded data piece 201 and a second coded data piece 202. With reference to FIG. 2, an error correction method will be described.

The composite coded data piece 203 includes first coded data pieces 206, 207, 208, 209, 210 and 211 which have been error-correction-coded using a first error correction code; and second coded data pieces 212, 213, 214, 215, 216, 217, 218 and 219 which have been error-correction-coded using a second error correction code having a lower degree of redundancy than the first error correction code. The composite coded data piece 203 also includes synchronization data pieces 204 and 205 for synchronizing the first coded data piece and the second coded data piece.

The first coded data piece 201 is error-corrected using 24 first error correction codes. The second coded data piece 202 is error-correction-coded using 304 second error correction codes. The first coded data piece 201 is divided into the plurality of first coded data pieces 206 through 211. The second coded data piece 202 is divided into the plurality of second coded data pieces 212 through 219. The first coded data pieces 206 through 211 each include a plurality of first symbols, and the second coded data pieces 212 through 219 each include a plurality of second symbols.

Between two adjacent synchronization data pieces, among a plurality of synchronization data pieces, at least one first coded data piece is provided. For example, as shown in FIG. 2, the first coded data pieces 206 through 208 including the first symbols are arranged between two adjacent synchronization data pieces 204 and 205. Thus, at least one first symbol is provided between two adjacent synchronization data pieces.

Between the synchronization data piece and the first coded data piece, at least one second coded data piece is provided. Between two adjacent first coded data pieces, at least one second coded data piece is provided. For example, as shown in FIG. 2, the second coded data piece 212 is provided between the synchronization data piece 204 and the first coded data piece 206. The second coded data piece 213 is provided between two adjacent first coded data pieces 206 and 207. Thus, at least one second symbol is provided between the synchronization data piece and the first symbol, and between two first symbols. In FIG. 2, 38 second symbols are arranged between two first symbols adjacent to each other in a recording direction 220. 38 second symbols are arranged between the synchronization data piece and the first symbol adjacent to each other in the recording direction 220.

The first coded data piece 201 and the second coded data piece 202 are respectively divided into the first coded data pieces 206 through 211 and the second coded data pieces 212 through 219 and thus arranged, such that local error areas on a recording medium are dispersed in the composite coded data piece 203. (Hereinafter, such a process of arranging the data in a dispersed manner will be referred to as "interleaving".)

On the recording medium, the above-described composite coded data pieces 203 are arranged in the recording direction 220.

The first error correction code is a Reed Solomon code over an extension field obtained by adding root α of the primitive polynomial (expression 1) to a prime field GF(2), having 30 information bytes and 32 parity bytes. The second error correction code is a Reed Solomon code over an extension field obtained by adding root α of the primitive polynomial (expression 1) to a prime field GF(2), having 216 information bytes and 32 parity bytes.

$$x^8+x^4+x^3+x^2+1=0 \qquad \text{expression 1}$$

FIG. 3 shows a flowchart 30 illustrating an error correction method of the composite corrected data piece 203.

In step 301, the first coded data piece 201 is error-corrected. At this point, the first coded data piece 201 is subjected to de-interleaving, which is the opposite transform to interleaving.

In step 302, erasure locator information, which indicates a position of erasure in the second coded data piece 202, is generated. The erasure locator information can be generated by, for example, one of the following three methods.

FIGS. 4 through 6 show the state of the synchronization data pieces or the first symbols when the second coded data piece is determined to represent erasure. In FIGS. 4 through 6, mark "X" represents that no synchronization data piece is detected or that the first symbol is incorrect. Mark "O" represents that synchronization data is detected or that the first symbol is correct. FIGS. 4 through 6 show a portion of the data corresponding to one row (or a plurality of rows), in the recording direction, of the composite corrected data piece 203 which is arranged in rows and columns.

With reference to FIG. 4, method 1 will be described. When, as shown in FIG. 4, the detection states of both the synchronization data pieces 401 and 402 which are adjacent to each other along a recording direction 404 (synchronization data pieces 401 and 402 maybe first symbols) are "X", a second coded data piece 403 between the synchronization data pieces 401 and 402 is determined to represent erasure. Thus, erasure locator information representing such a determination result is generated.

With reference to FIG. 5, method 2 will be described. When, as shown in FIG. 5, the detection state of the synchronization data pieces 501, 502 and 503 which are consecutive in a recording direction 506 (synchronization data pieces 501, 502 and 503 may be first symbols) is "XOX", the second coded data piece 504 between the synchronization data pieces 501 and 502, and the second coded data piece 505 between the synchronization data pieces 502 and 503, are determined to represent erasure. Thus, erasure locator information representing such a determination result is generated.

With reference to FIG. 6, method 3 will be described. When, as shown in FIG. 6, the detection states of three or more consecutive first symbols 602 through 604 between synchronization data pieces 601 and 605 which are adjacent in a recording direction 610 (synchronization data 601 and 605 may be first symbols) are "X", the second coded data pieces 606 through 609, including the second coded data piece 606 between the first symbol 602 and the synchronization data 601 (detection state: "○") and the second coded data piece 609 between the first symbol 604 and the synchronization data 605 (detection state: "○"), are determined to represent erasure. Thus, erasure locator information representing such a determination result is generated.

In step 303 (FIG. 3), erasure locator information generated in step 302 is used to perform erasure error correction of the second coded data pieces in the range represented by expression 2.

$$\epsilon + 2\nu \leq 32 \qquad \text{expression 2}$$

Here, $\epsilon$ is the number of erasure positions, and $\nu$ is the number of errors other than erasure.

By the above-described methods for generating erasure locator information, a second coded data piece may become undesirably uncorrectable. FIG. 7 is a partial enlarged view of the composite encoded data piece 203, which shows an example of an error pattern by which the second coded data piece becomes uncorrectable.

Data pieces 701 through 703 are each a first coded data piece or a synchronization data piece. Data pieces 704 through 709 are partial data pieces of the second coded data piece provided in the vicinity of the data piece 702. At the positions of marks "○" and "X", one of a partial synchronization data piece, a first symbol or a second symbol is provided. In data pieces 701 through 703, mark "X" represents that no synchronization data is detected or that the first symbol is incorrect. Mark "○" represents that synchronization data is detected or that the first symbol is correct. In data pieces 704 through 709, mark "X" represents that the second symbol which has been read is incorrect, and the other portions represent that the second symbol which has been read is correct.

It is assumed that the errors as shown in FIG. 7 occur. By the above-described methods for generating erasure locator information, the second symbols, which are incorrect, are not all determined to represent erasure. Since the second coded data is erasure-error-corrected in the range represented by expression 2, only up to 16 errors other than erasure can be corrected. Therefore, the errors of the pattern as shown in FIG. 7 cannot be corrected.

By the above-mentioned methods for generating erasure locator information, the state determination result of synchronization data piece which is used for generating the erasure locator information is either "detected" or "not detected". When a synchronization data piece is detected with a positional offset, the symbols positioned before such a synchronization data piece are incorrect with a high probability, and the symbols positioned after such a synchronization data piece are correct with a high probability. The reason is that the offset of the synchronization is corrected by a reproduction apparatus, and the symbols positioned after the synchronization data piece detected with a positional offset is read after the offset of synchronization is corrected.

In the case where the state determination result of synchronization data piece is either "detected" or "not detected", the following occurs. When a synchronization data piece detected with a positional offset is determined to be "detected", the symbols positioned before such a synchronization data piece may not be determined to represent erasure, despite the fact that these symbols are incorrect. As a result, the incorrect symbols may not be corrected. When a synchronization data piece detected with a positional offset is determined to be "not detected", even the correct symbols positioned after such a synchronization data piece may be determined to represent erasure. In such a case, the number of erasure positions is increased and the correction may become impossible.

SUMMARY OF THE INVENTION

According to one aspect of the invention, a reproduction method for reproducing a composite coded data piece from a recording medium having the composite coded data piece recorded thereon is provided. The composite coded data piece includes a first coded data piece which is error-correction-coded using a first error correction code, and a second coded data piece which is error-correction-coded using a second error correction code having a lower degree of redundancy than that of the first error correction code. The first coded data piece includes a plurality of first symbols. The second coded data piece includes a plurality of second symbols. At least one of the plurality of second symbols is provided between two adjacent first symbols of the plurality of first symbols. The plurality of first symbols include an Nth first symbol, an (N+1)th first symbol and an (N+2)th first symbol, where N is an integer. The reproduction method includes a reading step of reading the composite coded data piece from the recording medium and outputting the first coded data piece and the second coded data piece; an error location information generation step of performing error correction of the first coded data piece and generating error location information which represents an error location of the first coded data; an erasure locator information generation step of generating erasure locator information which represents an erasure position of the second coded data piece, based on the error location information; and an erasure error correction step of performing erasure error correction of the second coded data piece based on the erasure locator information. The erasure locator information generation step includes the step of, when the error location information indicates that no error is detected in the Nth first symbol and the (N+2)th first symbol and that an error is detected in the (N+1)th first symbol, determining at least one of the plurality of second symbols provided adjacent to the (N+1)th first symbol as representing erasure.

In one embodiment of the invention, the erasure locator information generation step further includes the step of, when the error location information indicates that no error is detected in the Nth first symbol and the (N+2)th first symbol and that an error is detected in the (N+1)th first symbol, determining at least one second symbol provided adjacent to the (N+1)th first symbol, among at least one second symbol provided between the Nth first symbol and the (N+1)th first symbol as representing erasure; and determining at least one second symbol provided adjacent to the (N+1)th first symbol, among at least one second symbol provided between the (N+1)th first symbol and the (N+2)th first symbol as representing erasure.

In one embodiment of the invention, the erasure locator information generation step further includes the step of, when the error location information indicates that an error is detected in both of two adjacent first symbols, determining all the second symbols provided between the two adjacent first symbols as representing erasure.

According to another aspect of the invention, a reproduction method for reproducing a composite coded data piece from a recording medium having the composite coded data piece recorded thereon is provided. The composite coded data piece includes a first coded data piece which is error-correction-coded using a first error correction code, and second coded data piece which is error-correction-coded using a second error correction code having a lower degree of redundancy than that of the first error correction code. The first coded data piece includes a plurality of first symbols. The second coded data piece includes a plurality of second symbols. At least two of the plurality of second symbols are provided between two adjacent first symbols of the plurality of first symbols. The reproduction method includes a reading step of reading the composite coded data piece from the recording medium and outputting the first coded data piece and the second coded data piece; an error location information generation step of performing error correction of the first coded data piece and generating error location information which represents an error location of the first coded data; an erasure locator information generation step of generating erasure locator information which represents an erasure position of the second coded data piece, based on the error location information; and an erasure error correction step of performing erasure error correction of the second coded data piece based on the erasure locator information. The erasure locator information generation step includes the step of, when the error location information indicates that a first symbol detected to have no error and a first symbol detected to have an error are adjacent to each other, determining at least one second symbol provided adjacent to the first symbol detected to have an error, among at least two second symbols provided between the first symbol detected to have no error and the first symbol detected to have an error, as representing erasure: and determining at least one second symbol provided adjacent to the first symbol detected to have no error as not representing erasure.

In one embodiment of the invention, the erasure locator information generation step further includes the step of, when the error location information indicates that an error is detected in both of two adjacent first symbols, determining all the second symbols provided between the two adjacent first symbols as representing erasure.

According to still another aspect of the invention, a reproduction method for reproducing a coded data piece from a recording medium having a plurality of synchronization data pieces and the coded data piece which is error-correction-coded recorded thereon is provided. The coded data piece includes a plurality of symbols. At least one of the plurality of symbols is provided between two adjacent synchronization data pieces among the plurality of synchronization data pieces. The plurality of synchronization data pieces include an Nth synchronization data piece, an (N+1)th synchronization data piece, and an (N+2)th synchronization data piece, where N is an integer. The reproduction method includes a reading step of reading the plurality of synchronization data pieces and the coded data piece from the recording medium; a synchronization detection information generation step of detecting states of the plurality of synchronization data pieces and generating synchronization detection information which represents the detection result: an erasure locator information generation step of generating erasure locator information which represents an erasure position of the coded data piece, based on the synchronization detection information; and an erasure error correction step of performing erasure error correction of the coded data piece based on the erasure locator information. The erasure locator information generation step includes the step of, when the synchronization detection information indicates that the Nth synchronization data piece and the (N+2)th synchronization data piece are detected and the (N+1)th synchronization data piece is not detected, determining at least one of the plurality of symbols provided adjacent to the (N+1)th synchronization data piece as representing erasure.

In one embodiment of the invention, the erasure locator information generation step further includes the step of, when the synchronization detection information indicates that the Nth synchronization data piece and the (N+2)th synchronization data piece are detected and the (N+1)th synchronization data piece is not detected, determining at least one symbol provided adjacent to the (N+1)th synchronization data piece, among at least one symbol provided between the Nth synchronization data piece and the (N+1)th synchronization data piece as representing erasure; and determining at least one symbol provided adjacent to the (N+1)th synchronization data piece, among at least one symbol provided between the (N+1)th synchronization data piece and the (N+2)th synchronization data piece as representing erasure.

In one embodiment of the invention, the erasure locator information generation step further includes the step of, when the synchronization detection information indicates that neither of the two adjacent synchronization data pieces are detected, determining all the symbols provided between the two undetected synchronization data pieces as representing erasure.

According to still another aspect of the invention, a reproduction method for reproducing a coded data piece from a recording medium having a plurality of synchronization data pieces and the coded data piece which is error-correction-coded recorded thereon is provided. The coded data piece includes a plurality of symbols. At least two of the plurality of symbols are provided between two adjacent synchronization data pieces of the plurality of synchronization data pieces. The reproduction method includes a reading step of reading the plurality of synchronization data pieces and the coded data piece from the recording medium; a synchronization detection information generation step of detecting states of the plurality of synchronization data pieces and generating synchronization detection information which represents the detection result; an erasure locator information generation step of generating erasure locator information which represents an erasure position of the coded data piece, based on the synchronization detection information; and an erasure error correction step of performing erasure error correction of the coded data piece based on the erasure locator information. The erasure locator information generation step includes the step of, when the synchronization detection information indicates that a synchronization data piece adjacent to a detected synchronization data piece is not detected, determining at least one symbol adjacent to the undetected synchronization data piece, among at least two symbols provided between the detected synchronization data piece and the undetected synchronization data piece, as representing erasure; and determining at least one symbol provided adjacent to the detected synchronization data piece as not representing erasure.

In one embodiment of the invention, the erasure locator information generation step further includes the step of, when the synchronization detection information indicates that neither of the two adjacent synchronization data pieces are detected, determining all the symbols provided between the two undetected synchronization data pieces as representing erasure.

According to still another aspect of the invention, a reproduction method for reproducing a composite coded data piece from a recording medium having the composite coded data piece recorded thereon is provided. The composite coded data piece includes a first coded data piece which is error-correction-coded using a first error correction code, a second coded data piece which is error-correction-coded using a second error correction code having a lower degree of redundancy than that of the first error correction code, and a plurality of synchronization data pieces. The first coded data piece includes a plurality of first symbols. The second coded data piece includes a plurality of second symbols. At least one first symbol is provided between two adjacent synchronization data pieces among the plurality of synchronization data pieces. At least one of the plurality of second symbols is provided at least between a synchronization data piece and a first symbol. The reproduction method includes a reading step of reading the composite coded data piece from the recording medium and outputting the first coded data piece, the second coded data piece, and the plurality of synchronization data pieces; a synchronization detection information generation step of detecting states of the plurality of synchronization data pieces and generating synchronization detection information which represents the detection result; an error location information generation step of performing error correction of the first coded data piece and generating error location information which represents an error location of the first coded data; an erasure locator information generation step of generating erasure locator information which represents an erasure position of the second coded data piece, based on the error location information and the synchronization detection information; and an erasure error correction step of performing erasure error correction of the second coded data piece based on the erasure locator information. The erasure locator information generation step includes the step of, when the synchronization detection information indicates that there is a synchronization data piece which is not detected and the error location information indicates that no error is detected in the first symbols immediately on both sides of the undetected synchronization data piece, determining at least one of the plurality of second symbols provided adjacent to the undetected synchronization data piece as representing erasure.

In one embodiment of the invention, at least two first symbols are provided between two adjacent synchronization data pieces among the plurality of synchronization data pieces. At least one second symbol is provided between two adjacent first symbols among the at least two first symbols. The erasure locator information generation step further includes the step of, when the error location information indicates that there is a first symbol detected to have an error and at least one of the error location information and the synchronization detection information indicates that one of a detected synchronization data piece and a first symbol detected to have no error is immediately on each of both sides of the first symbol detected to have an error, determining at least one of the plurality of second symbols provided adjacent to the first symbol detected to have an error as representing erasure.

According to still another aspect of the invention, a reproduction method for reproducing a coded data piece from a recording medium having a plurality of synchronization data pieces and the coded data piece which is error-correction-coded recorded thereon is provided. The coded data piece includes a plurality of symbols. At least one of the plurality of symbols is provided between two adjacent synchronization data pieces among the plurality of synchronization data pieces. The plurality of synchronization data pieces include an Nth synchronization data piece and an (N+1)th synchronization data piece, where N is an integer. The reproduction method includes a reading step of reading the plurality of synchronization data pieces and the coded data piece from the recording medium; a synchronization detection information generation step of detecting states of the plurality of synchronization data pieces and generating synchronization detection information which represents the detection result; an erasure locator information generation step of generating erasure locator information which represents an erasure position of the coded data piece, based on the synchronization detection information; and an erasure error correction step of performing erasure error correction of the coded data piece based on the erasure locator information. The erasure locator information generation step includes the step of, when the synchronization detection information indicates that the (N+1)th synchronization data piece is detected with a positional offset, determining at least one symbol provided between the Nth synchronization data piece and the (N+1)th synchronization data piece as representing erasure.

In one embodiment of the invention, the plurality of synchronization data pieces include an (N+2)th synchronization data piece. The erasure locator information generation step further includes the step of, when the synchronization detection information indicates that the (N+1)th synchronization data piece is detected with a positional offset, determining at least one symbol provided between the (N+1)th synchronization data piece and the (N+2)th synchronization data piece as not representing erasure.

According to still another aspect of the invention, a reproduction method for reproducing a composite coded data piece from a recording medium having the composite coded data piece recorded thereon is provided. The composite coded data piece includes a first coded data piece which is error-correction-coded using a first error correction code, a second coded data piece which is error-correction-coded using a second error correction code having a lower degree of redundancy than that of the first error correction code, and a plurality of synchronization data pieces. The first coded data piece includes a plurality of first symbols. The second coded data piece includes a plurality of second symbols. At least one first symbol is provided between two adjacent synchronization data pieces among the plurality of synchronization data pieces. At least one of the plurality of second symbols is provided at least between a synchronization data piece and a first symbol. The plurality of synchronization data pieces include an Nth synchronization data piece and an (N+1)th synchronization data piece, where N is an integer. The reproduction method includes a reading step of reading the composite coded data piece from the recording medium and outputting the first coded data piece, the second coded data piece, and the plurality of synchronization data pieces; a synchronization detection information generation step of detecting states of the plurality of synchronization data pieces and generating synchronization detection information which represents the detection result; an error location information generation step of performing error correction of the first coded data piece and generating error location information which represents an error location of the first coded data; an erasure locator information generation step of generating erasure locator information which represents an erasure position of the second coded data piece, based on the error location information and the synchronization detection information; and an erasure error correction step of performing erasure error correction of the second coded data piece based on the erasure locator information. The erasure locator information generation step includes the step of, when the synchronization detection information indicates that the (N+1)th synchronization data piece is detected with a positional offset, determining at least one second symbol provided between the Nth synchronization data piece and the (N+1)th synchronization data piece as representing erasure.

In one embodiment of the invention, the plurality of synchronization data pieces include an (N+2)th synchronization data piece. The erasure locator information generation step further includes the step of, when the synchronization detection information indicates that the (N+1)th synchronization data piece is detected with a positional offset, determining at least one second symbol provided between the (N+1)th synchronization data piece and the (N+2)th synchronization data piece as not representing erasure.

According to still another aspect of the invention, a reproduction method for reproducing a composite coded data piece from a recording medium having the composite coded data piece recorded thereon is provided. The composite coded data piece includes a first coded data piece which is error-correction-coded using a first error correction code, a second coded data piece which is error-correction-coded using a second error correction code having a lower degree of redundancy than that of the first error correction code, and a plurality of synchronization data pieces. The first coded data piece includes a plurality of first symbols. The second coded data piece includes a plurality of second symbols. At least one first symbol is provided between two adjacent synchronization data pieces among the plurality of synchronization data pieces. At least one of the plurality of second symbols is provided at least between a synchronization data piece and a first symbol. The plurality of synchronization data pieces include an Nth synchronization data piece and an (N+1)th synchronization data piece, where N is an integer. A prescribed first symbol is provided between the Nth synchronization data piece and the (N+1)th synchronization data piece. The reproduction method includes a reading step of reading the composite coded data piece from the recording medium and outputting the first coded data piece, the second coded data piece, and the plurality of synchronization data pieces; a synchronization detection information generation step of detecting states of the plurality of synchronization data pieces and generating synchronization detection information which represents the detection result; an error location information generation step of performing error correction of the first coded data piece and generating error location information which represents an error location of the first coded data; an erasure locator information generation step of generating erasure locator information which represents an erasure position of the second coded data piece, based on the error location information and the synchronization detection information; and an erasure error correction step of performing erasure error correction of the second coded data piece based on the erasure locator information. The erasure locator information generation step includes the step of, when the synchronization detection information indicates that the (N+1)th synchronization data piece is detected with a positional offset, determining at least one second symbol provided between the prescribed first symbol and the (N+1)th synchronization data piece as representing erasure.

In one embodiment of the invention, the plurality of synchronization data pieces include an (N+2)th synchronization data piece. Another prescribed first symbol is provided between the (N+1)th synchronization data piece and the (N+2)th synchronization data piece. The erasure locator information generation step further includes the step of, when the synchronization detection information indicates that the (N+1)th synchronization data piece is detected with a positional offset, determining at least one second symbol provided between the (N+1)th synchronization data piece and the another prescribed first symbol as not representing erasure.

According to still another aspect of the invention, a reproduction method for reproducing a coded data piece from a recording medium having a plurality of synchronization data pieces and the coded data piece which is error-correction-coded recorded thereon is provided. The coded data piece includes a plurality of symbols. At least one of the plurality of symbols is provided between two adjacent synchronization data pieces of the plurality of synchronization data pieces. The reproduction method includes a reading step of reading the plurality of synchronization data pieces and the coded data piece from the recording medium; a synchronization detection information generation step of detecting states of the plurality of synchronization data pieces and generating synchronization detection information which represents the detection result; an erasure locator information generation step of generating erasure locator information which represents an erasure position of the coded data piece, based on the synchronization detection information; and an erasure error correction step of performing erasure error correction of the coded data piece based on the erasure locator information. The erasure locator information generation step includes the step of, when the synchronization detection information indicates that any two or more data pieces from undetected synchronization data pieces and synchronization data pieces detected with a positional offset are consecutive, determining at least one symbol provided between the consecutive synchronization data pieces as representing erasure.

According to still another aspect of the invention, a reproduction method for reproducing a composite coded data piece from a recording medium having the composite coded data piece recorded thereon is provided. The composite coded data piece includes a first coded data piece which is error-correction-coded using a first error correction code, a second coded data piece which is error-correction-coded using a second error correction code having a lower degree of redundancy than that of the first error correction code, and a plurality of synchronization data pieces. The first coded data piece includes a plurality of first symbols. The second coded data piece includes a plurality of second symbols. At least one first symbol is provided between two adjacent synchronization data pieces among the plurality of synchronization data pieces. At least one of the plurality of second symbols is provided at least between a synchronization data piece and a first symbol. The reproduction method includes a reading step of reading the composite coded data piece from the recording medium and outputting the first coded data piece, the second coded data piece, and the plurality of synchronization data pieces; a synchronization detection information generation step of detecting states of the plurality of synchronization data pieces and generating synchronization detection information which represents the detection result; an error location information generation step of performing error correction of the first coded data piece and generating error location information which represents an error location of the first coded data; an erasure locator information generation step of generating erasure locator information which represents an erasure position of the second coded data piece, based on the error location information and the synchronization detection information; and an erasure error correction step of performing erasure error correction of the second coded data piece based on the erasure locator information. The erasure locator information generation step of, when the synchronization detection information indicates that any two or more data pieces from undetected synchronization data pieces and synchronization data pieces detected with a positional offset are consecutive, determining at least one second symbol provided between the consecutive synchronization data pieces as representing erasure.

In one embodiment of the invention, the erasure locator information generation step further includes the step of determining at least one first symbol provided between the consecutive synchronization data pieces as representing erasure.

According to still another aspect of the invention, a reproduction method for reproducing a composite coded data piece from a recording medium having the composite coded data piece recorded thereon is provided. The composite coded data piece includes a first coded data piece which is error-correction-coded using a first error correction code, and a second coded data piece which is error-correction-coded using a second error correction code having a lower degree of redundancy than that of the first error correction code. The first coded data piece includes a plurality of first symbols. The second coded data piece includes a plurality of second symbols. At least one of the plurality of second symbols is provided between two adjacent first symbols of the plurality of first symbols. The reproduction method includes a reading step of reading the composite coded data piece from the recording medium and outputting the first coded data piece and the second coded data piece; an error location information generation step of performing error correction of the first coded data piece and generating error location information which represents an error location of the first coded data; an erasure locator information generation step of generating at least first erasure locator information and second erasure locator information which represent an erasure position of the second coded data piece, based on the error location information; and an erasure error correction step of performing erasure error correction of the second coded data piece based on at least one of the first erasure locator information and the second erasure locator information. The erasure error correction step includes the step of, when there is an error which cannot be corrected based on the first erasure locator information, performing erasure error correction of the second coded data piece based on the second erasure locator information.

In one embodiment of the invention, the erasure locator information generation step includes the steps of: when all the errors can be corrected based on the first erasure locator information, generating erasure locator information for erasure error correction of another second coded data piece using an identical method as the method used for generating the first erasure locator information, and when all the errors can be corrected based on the second erasure locator information, generating erasure locator information for erasure error correction of another second coded data piece using an identical method as the method used for generating the second erasure locator information.

In one embodiment of the invention, the plurality of first symbols include an Nth first symbol, an (N+1)th first symbol and an (N+2)th first symbol, where N is an integer. The erasure locator information generation step includes the step of, when the error location information indicates that no error is detected in the Nth first symbol and the (N+2)th first symbol and that an error is detected in the (N+1)th first symbol, determining at least one of the plurality of second symbols provided adjacent to the (N+1)th first symbol as representing erasure.

According to still another aspect of the invention, a reproduction method for reproducing a coded data piece from a recording medium having a plurality of synchronization data pieces and the coded data piece which is error-correction-coded recorded thereon is provided. The coded data piece includes a plurality of symbols. At least one of the plurality of symbols is provided between two adjacent synchronization data pieces among the plurality of synchronization data pieces. The reproduction method includes a reading step of reading the plurality of synchronization data pieces and the coded data piece from the recording medium; a synchronization detection information generation step of detecting states of the plurality of synchronization data pieces and generating synchronization detection information which represents the detection result; an erasure locator information generation step of generating at least first erasure locator information and second erasure locator information which represent an erasure position of the coded data piece, based on the synchronization detection information; and an erasure error correction step of performing erasure error correction of the coded data piece based on at least one of the first erasure locator information and the second erasure locator information. The erasure error correction step includes the step of, when there is an error which cannot be corrected based on the first erasure locator information, performing erasure error correction of the coded data piece based on the second erasure locator information.

In one embodiment of the invention, the erasure locator information generation step includes the steps of when all the errors can be corrected based on the first erasure locator information, generating erasure locator information for erasure error correction of another coded data piece using an identical method as the method used for generating the first erasure locator information, and when all the errors can be corrected based on the second erasure locator information, generating erasure locator information for erasure error correction of another coded data piece using an identical method as the method used for generating the second erasure locator information.

In one embodiment of the invention, the plurality of synchronization data pieces include an Nth synchronization data piece, an (N+1)th synchronization data piece, and an (N+2)th synchronization data piece, where N is an integer. The erasure locator information generation step includes the step of, when the synchronization detection information indicates that the Nth synchronization data piece and the (N+2)th synchronization data piece are detected and the (N+1)th synchronization data piece is not detected, determining at least one of the plurality of symbols provided adjacent to the (N+1)th synchronization data piece as representing erasure.

In one embodiment of the invention, the plurality of synchronization data pieces include an Nth synchronization data piece and an (N+1)th synchronization data piece, where N is an integer. The erasure locator information generation step includes the step of, when the synchronization detection information indicates that the (N+1)th synchronization data piece is detected with a positional offset, determining at least one symbol provided between the Nth synchronization data piece and the (N+1)th synchronization data piece as representing erasure.

In one embodiment of the invention, the erasure locator information generation step includes the step of, when the synchronization detection information indicates that any two or more data pieces from undetected synchronization data pieces and synchronization data pieces detected with a positional offset are consecutive, determining at least one symbol provided between the consecutive synchronization data pieces as representing erasure.

According to still another aspect of the invention, a reproduction method for reproducing a composite coded data piece from a recording medium having the composite coded data piece recorded thereon is provided. The composite coded data piece includes a first coded data piece which is error-correction-coded using a first error correction code, a second coded data piece which is error-correction-coded using a second error correction code having a lower degree of redundancy than that of the first error correction code, and a plurality of synchronization data pieces. The first coded data piece includes a plurality of first symbols. The second coded data piece includes a plurality of second symbols. At least one first symbol is provided between two adjacent synchronization data pieces among the plurality of synchronization data pieces. At least one of the plurality of second symbols is provided at least between a synchronization data piece and a first symbol. The reproduction method includes a reading step of reading the composite coded data piece from the recording medium and outputting the first coded data piece, the second coded data piece, and the plurality of synchronization data pieces; a synchronization detection information generation step of detecting states of the plurality of synchronization data pieces and generating synchronization detection information which represents the detection result; an error location information generation step of performing error correction of the first coded data piece and generating error location information which represents an error location of the first coded data; an erasure locator information generation step of generating at least first erasure locator information and second erasure locator information which represent an erasure position of the second coded data piece, based on the error location information and the synchronization detection information; and an erasure error correction step of performing erasure error correction of the second coded data piece based on at least one of the first erasure locator information and the second erasure locator information. The erasure error correction step includes the step of, when there is an error which cannot be corrected based on the first erasure locator information, performing erasure error correction of the second coded data piece based on the second erasure locator information.

In one embodiment of the invention, the erasure locator information generation step includes the steps of: when all the errors can be corrected based on the first erasure locator information, generating erasure locator information for erasure error correction of another second coded data piece using an identical method as the method used for generating the first erasure locator information, and when all the errors can be corrected based on the second erasure locator information, generating erasure locator information for erasure error correction of another second coded data piece using an identical method as the method used for generating the second erasure locator information.

In one embodiment of the invention, the erasure locator information generation step includes the steps of, when the synchronization detection information indicates that there is a synchronization data piece which is not detected and the error location information indicates that no error is detected in the first symbols immediately on both sides of the undetected synchronization data piece, determining at least one of the plurality of second symbols provided adjacent to the undetected synchronization data piece as representing erasure.

In one embodiment of the invention, at least two first symbols are provided between two adjacent synchronization data pieces among the plurality of synchronization data pieces. At least one second symbol is provided between two adjacent first symbols among the at least two first symbols. The erasure locator information generation step includes the step of, when the error location information indicates that there is a first symbol detected to have an error and at least one of the error location information and the synchronization detection information indicates that one of a detected synchronization data piece and a first symbol detected to have no error is immediately on each of both sides of the first symbol detected to have an error, determining at least one of the plurality of second symbols provided adjacent to the first symbol detected to have an error as representing erasure.

In one embodiment of the invention, the plurality of synchronization data pieces include an Nth synchronization data piece and an (N+1)th synchronization data piece, where N is an integer. The erasure locator information generation step includes the step of, when the synchronization detection information indicates that the (N+1)th synchronization data piece is detected with a positional offset, determining at least one second symbol provided between the Nth synchronization data piece and the (N+1)th synchronization data piece as representing erasure.

In one embodiment of the invention, the erasure locator information generation step includes the step of, when the synchronization detection information indicates that any two or more data pieces from undetected synchronization data pieces and synchronization data pieces detected with a positional offset are consecutive, determining at least one second symbol provided between the consecutive synchronization data pieces as representing erasure.

According to still another aspect of the invention, a reproduction apparatus for reproducing a composite coded data piece from a recording medium having the composite coded data piece recorded thereon is provided. The composite coded data piece includes a first coded data piece which is error-correction-coded using a first error correction code, and a second coded data piece which is error-correction-coded using a second error correction code having a lower degree of redundancy than that of the first error correction code. The first coded data piece includes a plurality of first symbols. The second coded data piece includes a plurality of second symbols. At least one of the plurality of second symbols is provided between two adjacent first symbols of the plurality of first symbols. The plurality of first symbols include an Nth first symbol, an (N+1)th first symbol and an (N+2)th first symbol, where N is an integer. The reproduction apparatus includes a reading section for reading the composite coded data piece from the recording medium and outputting the first coded data piece and the second coded data piece; an error location information generation section for performing error correction of the first coded data piece and generating error location information which represents an error location of the first coded data; an erasure locator information generation section for generating erasure locator information which represents an erasure position of the second coded data piece, based on the error location information; and an erasure error correction section for performing erasure error correction of the second coded data piece based on the erasure locator information. When the error location information indicates that no error is detected in the Nth first symbol and the (N+2)th first symbol and that an error is detected in the (N+1)th first symbol, the erasure locator information generation section determines at least one of the plurality of second symbols provided adjacent to the (N+1)th first symbol as representing erasure.

In one embodiment of the invention, when the error location information indicates that no error is detected in the Nth first symbol and the (N+2)th first symbol and that an error is detected in the (N+1)th first symbol, the erasure locator information generation section determines at least one second symbol provided adjacent to the (N+1)th first symbol, among at least one second symbol provided between the Nth first symbol and the (N+1)th first symbol as representing erasure; and determining at least one second symbol provided adjacent to the (N+1)th first symbol, among at least one second symbol provided between the (N+1)th first symbol and the (N+2)th first symbol as representing erasure.

In one embodiment of the invention, when the error location information indicates that an error is detected in both of two adjacent first symbols, the erasure locator information generation section determines all the second symbols provided between the two adjacent first symbols as representing erasure.

According to still another aspect of the invention, a reproduction apparatus for reproducing a composite coded data piece from a recording medium having the composite coded data piece recorded thereon is provided. The composite coded data piece includes a first coded data piece which is error-correction-coded using a first error correction code, and a second coded data piece which is error-correction-coded using a second error correction code having a lower degree of redundancy than that of the first error correction code. The first coded data piece includes a plurality of first symbols. The second coded data piece includes a plurality of second symbols. At least two of the plurality of second symbols are provided between two adjacent first symbols of the plurality of first symbols. The reproduction apparatus includes a reading section for reading the composite coded data piece from the recording medium and outputting the first coded data piece and the second coded data piece; an error location information generation section for performing error correction of the first coded data piece and generating error location information which represents an error location of the first coded data; an erasure locator information generation section for generating erasure locator information which represents an erasure position of the second coded data piece, based on the error location information; and an erasure error correction section for performing erasure error correction of the second coded data piece based on the erasure locator information. When the error location information indicates that a first symbol detected to have no error and a first symbol detected to have an error are adjacent to each other, the erasure locator information generation section determines at least one second symbol provided adjacent to the first symbol detected to have an error, among at least two second symbols provided between the first symbol detected to have no error and the first symbol detected to have an error, as representing erasure; and determines at least one second symbol provided adjacent to the first symbol detected to have no error as not representing erasure.

In one embodiment of the invention, when the error location information indicates that an error is detected in both of two adjacent first symbols, the erasure locator information generation section determines all the second symbols provided between the two adjacent first symbols as representing erasure.

According to still another aspect of the invention, a reproduction apparatus for reproducing a coded data piece from a recording medium having a plurality of synchronization data pieces and the coded data piece which is error-correction-coded recorded thereon is provided. The coded data piece includes a plurality of symbols. At least one of the plurality of symbols is provided between two adjacent synchronization data pieces among the plurality of synchronization data pieces. The plurality of synchronization data pieces include an Nth synchronization data piece, an (N+1)th synchronization data piece, and an (N+2)th synchronization data piece, where N is an integer. The reproduction apparatus includes a reading section for reading the plurality of synchronization data pieces and the coded data piece from the recording medium; a synchronization detection information generation section for detecting states of the plurality of synchronization data pieces and generating synchronization detection information which represents the detection result; an erasure locator information generation section for generating erasure locator information which represents an erasure position of the coded data piece, based on the synchronization detection information; and an erasure error correction section for performing erasure error correction of the coded data piece based on the erasure locator information. When the synchronization detection information indicates that the Nth synchronization data piece and the (N+2)th synchronization data piece are detected and the (N+1)th synchronization data piece is not detected, the erasure locator information generation section determines at least one of the plurality of symbols provided adjacent to the (N+1)th synchronization data piece as representing erasure.

In one embodiment of the invention, when the synchronization detection information indicates that the Nth synchronization data piece and the (N+2)th synchronization data piece are detected and the (N+1)th synchronization data piece is not detected, the erasure locator information generation section determines at least one symbol provided adjacent to the (N+1)th synchronization data piece, among at least one symbol provided between the Nth synchronization data piece and the (N+1)th synchronization data piece as representing erasure; and determines at least one symbol provided adjacent to the (N+1)th synchronization data piece, among at least one symbol provided between the (N+1)th synchronization data piece and the (N+2)th synchronization data piece as representing erasure.

In one embodiment of the invention, when the synchronization detection information indicates that neither of the two adjacent synchronization data pieces are detected, the erasure locator information generation section determines all the symbols provided between the two undetected synchronization data pieces as representing erasure.

According to still another aspect of the invention, a reproduction apparatus for reproducing a coded data piece from a recording medium having a plurality of synchronization data pieces and the coded data piece which is error-correction-coded recorded thereon is provided. The coded data piece includes a plurality of symbols. At least two of the plurality of symbols are provided between two adjacent synchronization data pieces of the plurality of synchronization data pieces. The reproduction apparatus includes a reading section for reading the plurality of synchronization data pieces and the coded data piece from the recording medium; a synchronization detection information generation section for detecting states of the plurality of synchronization data pieces and generating synchronization detection information which represents the detection result an erasure locator information generation section for generating erasure locator information which represents an erasure position of the coded data piece, based on the synchronization detection information; and an erasure error correction section for performing erasure error correction of the coded data piece based on the erasure locator information. When the synchronization detection information indicates that a synchronization data piece adjacent to a detected synchronization data piece is not detected, the erasure locator information generation section determines at least one symbol provided adjacent to the undetected synchronization data piece, among at least two symbols provided between the detected synchronization data piece and the undetected synchronization data piece, as representing erasure; and determines at least one symbol provided adjacent to the detected synchronization data piece as not representing erasure.

In one embodiment of the invention, when the synchronization detection information indicates that neither of the two adjacent synchronization data pieces are detected, the erasure locator information generation section determines all the symbols provided between the two undetected synchronization data pieces as representing erasure.

According to still another aspect of the invention, a reproduction apparatus for reproducing a composite coded data piece from a recording medium having the composite coded data piece recorded thereon is provided. The composite coded data piece includes a first coded data piece which is error-correction-coded using a first error correction code, a second coded data piece which is error-correction-coded using a second error correction code having a lower degree of redundancy than that of the first error correction code, and a plurality of synchronization data pieces. The first coded data piece includes a plurality of first symbols. The second coded data piece includes a plurality of second symbols. At least one first symbol is provided between two adjacent synchronization data pieces among the plurality of synchronization data pieces. At least one of the plurality of second symbols is provided at least between a synchronization data piece and a first symbol. The reproduction apparatus includes a reading section for reading the composite coded data piece from the recording medium and outputting the first coded data piece, the second coded data piece, and the plurality of synchronization data pieces; a synchronization detection information generation section for detecting states of the plurality of synchronization data pieces and generating synchronization detection information which represents the detection result; an error location information generation section for performing error correction of the first coded data piece and generating error location information which represents an error location of the first coded data; an erasure locator information generation section for generating erasure locator information which represents an erasure position of the second coded data piece, based on the error location information and the synchronization detection information; and an erasure error correction section for performing erasure error correction of the second coded data piece based on the erasure locator information. When the synchronization detection information indicates that there is a synchronization data piece which is not detected and the error location information indicates that no error is detected in the first symbols immediately on both sides of the undetected synchronization data piece, the erasure locator information generation section determines at least one of the plurality of second symbols provided adjacent to the undetected synchronization data piece as representing erasure.

In one embodiment of the invention, at least two first symbols are provided between two adjacent synchronization data pieces among the plurality of synchronization data pieces. At least one second symbol is provided between two adjacent first symbols among the at least two first symbols. When the error location information indicates that there is a first symbol detected to have an error and at least one of the error location information and the synchronization detection information indicates that one of a detected synchronization data piece and a first symbol detected to have no error is immediately on each of both sides of the first symbol detected to have an error, the erasure locator information generation section determines at least one of the plurality of second symbols provided adjacent to the first symbol detected to have an error as representing erasure.

According to still another aspect of the invention, a reproduction apparatus for reproducing a coded data piece from a recording medium having a plurality of synchronization data pieces and the coded data piece which is error-correction-coded recorded thereon is provided. The coded data piece includes a plurality of symbols. At least one of the plurality of symbols is provided between two adjacent synchronization data pieces among the plurality of synchronization data pieces. The plurality of synchronization data pieces include an Nth synchronization data piece and an (N+1)th synchronization data piece, where N is an integer. The reproduction apparatus includes a reading section for reading the plurality of synchronization data pieces and the coded data piece from the recording medium; a synchronization detection information generation section for detecting states of the plurality of synchronization data pieces and generating synchronization detection information which represents the detection result; an erasure locator information generation section for generating erasure locator information which represents an erasure position of the coded data piece, based on the synchronization detection information; and an erasure error correction section for performing erasure error correction of the coded data piece based on the erasure locator information. When the synchronization detection information indicates that the (N+1)th synchronization data piece is detected with a positional offset, the erasure locator information generation section determines at least one symbol provided between the Nth synchronization data piece and the (N+1)th synchronization data piece as representing erasure.

In one embodiment of the invention, the plurality of synchronization data pieces include an (N+2)th synchronization data piece. When the synchronization detection information indicates that the (N+1)th synchronization data piece is detected with a positional offset, the erasure locator information generation section determines at least one symbol provided between the (N+1)th synchronization data piece and the (N+2)th synchronization data piece as not representing erasure.

According to still another aspect of the invention, a reproduction apparatus for reproducing a composite coded data piece from a recording medium having the composite coded data piece recorded thereon is provided. The composite coded data piece includes a first coded data piece which is error-correction-coded using a first error correction code, a second coded data piece which is error-correction-coded using a second error correction code having a lower degree of redundancy than that of the first error correction code, and a plurality of synchronization data pieces. The first coded data piece includes a plurality of first symbols. The second coded data piece includes a plurality of second symbols. At least one first symbol is provided between two adjacent synchronization data pieces among the plurality of synchronization data pieces. At least one of the plurality of second symbols is provided at least between a synchronization data piece and a first symbol. The plurality of synchronization data pieces include an Nth synchronization data piece and an (N+1)th synchronization data piece, where N is an integer. The reproduction apparatus includes a reading section for reading the composite coded data piece from the recording medium and outputting the first coded data piece, the second coded data piece, and the plurality of synchronization data pieces; a synchronization detection information generation section for detecting states of the plurality of synchronization data pieces and generating synchronization detection information which represents the detection result; an error location information generation section for performing error correction of the first coded data piece and generating error location information which represents an error location of the first coded data; an erasure locator information generation section for generating erasure locator information which represents an erasure position of the second coded data piece, based on the error location information and the synchronization detection information; and an erasure error correction section for performing erasure error correction of the second coded data piece based on the erasure locator information. When the synchronization detection information indicates that the (N+1)th synchronization data piece is detected with a positional offset, the erasure locator information generation section determines at least one second symbol provided between the Nth synchronization data piece and the (N+1)th synchronization data piece as representing erasure.

In one embodiment of the invention, the plurality of synchronization data pieces include an (N+2)th synchronization data piece. When the synchronization detection information indicates that the (N+1)th synchronization data piece is detected with a positional offset, the erasure locator information generation section determines at least one second symbol provided between the (N+1)th synchronization data piece and the (N+2)th synchronization data piece as not representing erasure.

According to still another aspect of the invention, a reproduction apparatus for reproducing a composite coded data piece from a recording medium having the composite coded data piece recorded thereon is provided. The composite coded data piece includes a first coded data piece which is error-correction-coded using a first error correction code, a second coded data piece which is error-correction-coded using a second error correction code having a lower degree of redundancy than that of the first error correction code, and a plurality of synchronization data pieces. The first coded data piece includes a plurality of first symbols. The second coded data piece includes a plurality of second symbols. At least one first symbol is provided between two adjacent synchronization data pieces among the plurality of synchronization data pieces. At least one of the plurality of second symbols is provided at least between a synchronization data piece and a first symbol. The plurality of synchronization data pieces include an Nth synchronization data piece and an (N+1)th synchronization data piece, where N is an integer. A prescribed first symbol is provided between the Nth synchronization data piece and the (N+1)th synchronization data piece. The reproduction apparatus includes a reading section for reading the composite coded data piece from the recording medium and outputting the first coded data piece, the second coded data piece, and the plurality of synchronization data pieces; a synchronization detection information generation section for detecting states of the plurality of synchronization data pieces and generating synchronization detection information which represents the detection result; an error location information generation section for performing error correction of the first coded data piece and generating error location information which represents an error location of the first coded data; an erasure locator information generation section for generating erasure locator information which represents an erasure position of the second coded data piece, based on the error location information and the synchronization detection information; and an erasure error correction section for performing erasure error correction of the second coded data piece based on the erasure locator information. When the synchronization detection information indicates that the (N+1)th synchronization data piece is detected with a positional offset, the erasure locator information generation section determines at least one second symbol provided between the prescribed first symbol and the (N+1)th synchronization data piece as representing erasure.

In one embodiment of the invention, the plurality of synchronization data pieces include an (N+2)th synchronization data piece. Another prescribed first symbol is provided between the (N+1)th synchronization data piece and the (N+2)th synchronization data piece. When the synchronization detection information indicates that the (N+1)th synchronization data piece is detected with a positional offset, the erasure locator information generation section determines at least one second symbol provided between the (N+1)th synchronization data piece and the another prescribed first symbol as not representing erasure.

According to still another aspect of the invention, a reproduction apparatus for reproducing a coded data piece from a recording medium having a plurality of synchronization data pieces and the coded data piece which is error-correction-coded recorded thereon is provided. The coded data piece includes a plurality of symbols. At least one of the plurality of symbols is provided between two adjacent synchronization data pieces of the plurality of synchronization data pieces. The reproduction apparatus includes a reading section for reading the plurality of synchronization data pieces and the coded data piece from the recording medium; a synchronization detection information generation section for detecting states of the plurality of synchronization data pieces and generating synchronization detection information which represents the detection result; an erasure locator information generation section for generating erasure locator information which represents an erasure position of the coded data piece, based on the synchronization detection information; and an erasure error correction section for performing erasure error correction of the coded data piece based on the erasure locator information. When the synchronization detection information indicates that any two or more data pieces from undetected synchronization data pieces and synchronization data pieces detected with a positional offset are consecutive, the erasure locator information generation section determines at least one symbol provided between the consecutive synchronization data pieces as representing erasure.

According to still another aspect of the invention, a reproduction apparatus for reproducing a composite coded data piece from a recording medium having the composite coded data piece recorded thereon is provided. The composite coded data piece includes a first coded data piece which is error-correction-coded using a first error correction code, a second coded data piece which is error-correction-coded using a second error correction code having a lower degree of redundancy than that of the first error correction code, and a plurality of synchronization data pieces. The first coded data piece includes a plurality of first symbols. The second coded data piece includes a plurality of second symbols. At least one first symbol is provided between two adjacent synchronization data pieces among the plurality of synchronization data pieces. At least one of the plurality of second symbols is provided at least between a synchronization data piece and a first symbol. The reproduction apparatus includes a reading section for reading the composite coded data piece from the recording medium and outputting the first coded data piece, the second coded data piece, and the plurality of synchronization data pieces; a synchronization detection information generation section for detecting states of the plurality of synchronization data pieces and generating synchronization detection information which represents the detection result; an error location information generation section for performing error correction of the first coded data piece and generating error location information which represents an error location of the first coded data; an erasure locator information generation section for generating erasure locator information which represents an erasure position of the second coded data piece, based on the error location information and the synchronization detection information; and an erasure error correction section for performing erasure error correction of the second coded data piece based on the erasure locator information. When the synchronization detection information indicates that any two or more data pieces from undetected synchronization data pieces and synchronization data pieces detected with a positional offset are consecutive, the erasure locator information generation section determines at least one second symbol provided between the consecutive synchronization data pieces as representing erasure.

In one embodiment of the invention, the erasure locator information generation section determines at least one first symbol provided between the consecutive synchronization data pieces as representing erasure.

According to still another aspect of the invention, a reproduction apparatus for reproducing a composite coded data piece from a recording medium having the composite coded data piece recorded thereon is provided. The composite coded data piece includes a first coded data piece which is error-correction-coded using a first error correction code, and a second coded data piece which is error-correction-coded using a second error correction code having a lower degree of redundancy than that of the first error correction code. The first coded data piece includes a plurality of first symbols. The second coded data piece includes a plurality of second symbols. At least one of the plurality of second symbols is provided between two adjacent first symbols of the plurality of first symbols. The reproduction apparatus includes a reading section for reading the composite coded data piece from the recording medium and outputting the first coded data piece and the second coded data piece; an error location information generation section for performing error correction of the first coded data piece and generating error location information which represents an error location of the first coded data; an erasure locator information generation section for generating at least first erasure locator information and second erasure locator information which represent an erasure position of the second coded data piece, based on the error location information; and an erasure error correction section for performing erasure error correction of the second coded data piece based on at least one of the first erasure locator information and the second erasure locator information. When there is an error which cannot be corrected based on the first erasure locator information, the erasure error correction section performs erasure error correction of the second coded data piece based on the second erasure locator information.

In one embodiment of the invention, when all the errors can be corrected based on the first erasure locator information, the erasure locator information generation section generates erasure locator information for erasure error correction of another second coded data piece using an identical method as the method used for generating the first erasure locator information. When all the errors can be corrected based on the second erasure locator information, the erasure locator information generation section generates erasure locator information for erasure error correction of another second coded data piece using an identical method as the method used for generating the second erasure locator information.

In one embodiment of the invention, the plurality of first symbols include an Nth first symbol, an (N+1)th first symbol and an (N+2) the first symbol, where N is an integer. When the error location information indicates that no error is detected in the Nth first symbol and the (N+2)th first symbol and that an error is detected in the (N+1)th first symbol, the erasure locator information generation section determines at least one of the plurality of second symbols provided adjacent to the (N+1)th first symbol as representing erasure.

According to still another aspect of the invention, a reproduction apparatus for reproducing a coded data piece from a recording medium having a plurality of synchronization data pieces and the coded data piece which is error-correction-coded recorded thereon is provided. The coded data piece includes a plurality of symbols. At least one of the plurality of symbols is provided between two adjacent synchronization data pieces among the plurality of synchronization data pieces. The reproduction apparatus includes a reading section for reading the plurality of synchronization data pieces and the coded data piece from the recording medium; a synchronization detection information generation section for detecting states of the plurality of synchronization data pieces and generating synchronization detection information which represents the detection result; an erasure locator information generation section for generating at least first erasure locator information and second erasure locator information which represent an erasure position of the coded data piece, based on the synchronization detection information; and an erasure error correction section for performing erasure error correction of the coded data piece based on at least one of the first erasure locator information and the second erasure locator information. When there is an error which cannot be corrected based on the first erasure locator information, the erasure error correction section performs erasure error correction of the coded data piece based on the second erasure locator information.

In one embodiment of the invention, when all the errors can be corrected based on the first erasure locator information, the erasure locator information generation section generates erasure locator information for erasure error correction of another coded data piece using an identical method as the method used for generating the first erasure locator information. When all the errors can be corrected based on the second erasure locator information, the erasure locator information generation section generates erasure locator information for erasure error correction of another coded data piece using an identical method as the method used for generating the second erasure locator information.

In one embodiment of the invention, the plurality of synchronization data pieces include an Nth synchronization data piece, an (N+1)th synchronization data piece, and an (N+2)th synchronization data piece, where N is an integer. When the synchronization detection information indicates that the Nth synchronization data piece and the (N+2)th synchronization data piece are detected and the (N+1)th synchronization data piece is not detected, the erasure locator information generation section determines at least one of the plurality of symbols provided adjacent to the (N+1)th synchronization data piece as representing erasure.

In one embodiment of the invention, the plurality of synchronization data pieces include an Nth synchronization data piece and an (N+1)th synchronization data piece, where N is an integer. When the synchronization detection information indicates that the (N+1)th synchronization data piece is detected with a positional offset, the erasure locator information generation section determines at least one symbol provided between the Nth synchronization data piece and the (N+1)th synchronization data piece as representing erasure.

In one embodiment of the invention, when the synchronization detection information indicates that any two or more data pieces from undetected synchronization data pieces and synchronization data pieces detected with a positional offset are consecutive, the erasure locator information generation section determines at least one symbol provided between the consecutive synchronization data pieces as representing erasure.

According to still another aspect of the invention, a reproduction apparatus for reproducing a composite coded data piece from a recording medium having the composite coded data piece recorded thereon is provided. The composite coded data piece includes a first coded data piece which is error-correction-coded using a first error correction code, a second coded data piece which is error-correction-coded using a second error correction code having a lower degree of redundancy than that of the first error correction code, and a plurality of synchronization data pieces. The first coded data piece includes a plurality of first symbols. The second coded data piece includes a plurality of second symbols. At least one first symbol is provided between two adjacent synchronization data pieces among the plurality of synchronization data pieces. At least one of the plurality of second symbols is provided at least between a synchronization data piece and a first symbol. The reproduction apparatus includes a reading section for reading the composite coded data piece from the recording medium and outputting the first coded data piece, the second coded data piece, and the plurality of synchronization data pieces; a synchronization detection information generation section for detecting states of the plurality of synchronization data pieces and generating synchronization detection information which represents the detection result; an error location information generation section for performing error correction of the first coded data piece and generating error location information which represents an error location of the first coded data; an erasure locator information generation section for generating at least first erasure locator information and second erasure locator information which represent an erasure position of the second coded data piece, based on the error location information and the synchronization detection information; and an erasure error correction section for performing erasure error correction of the second coded data piece based on at least one of the first erasure locator information and the second erasure locator information. When there is an error which cannot be corrected based on the first erasure locator information, the erasure error correction section performs erasure error correction of the second coded data piece based on the second erasure locator information.

In one embodiment of the invention, when all the errors can be corrected based on the first erasure locator information, the erasure locator information generation section generates erasure locator information for erasure error correction of another second coded data piece using an identical method as the method used for generating the first erasure locator information. When all the errors can be corrected based on the second erasure locator information, the erasure locator information generation section generates erasure locator information for erasure error correction of another second coded data piece using an identical method as the method used for generating the second erasure locator information.

In one embodiment of the invention, when the synchronization detection information indicates that there is a synchronization data piece which is not detected and the error location information indicates that no error is detected in the first symbols immediately on both sides of the undetected synchronization data piece, the erasure locator information generation section determines at least one of the plurality of second symbols provided adjacent to the undetected synchronization data piece as representing erasure.

In one embodiment of the invention, at least two first symbols are provided between two adjacent synchronization data pieces among the plurality of synchronization data pieces. At least one second symbol is provided between two adjacent first symbols among the at least two first symbols. When the error location information indicates that there is a first symbol detected to have an error and at least one of the error location information and the synchronization detection information indicates that one of a detected synchronization data piece and a first symbol detected to have no error is immediately on each of both sides of the first symbol detected to have an error, the erasure locator information generation section determines at least one of the plurality of second symbols provided adjacent to the first symbol detected to have an error as representing erasure.

In one embodiment of the invention, the plurality of synchronization data pieces include an Nth synchronization data piece and an (N+1)th synchronization data piece, where N is an integer. When the synchronization detection information indicates that the (N+1)th synchronization data piece is detected with a positional offset, the erasure locator information generation section determines at least one second symbol provided between the Nth synchronization data piece and the (N+1)th synchronization data piece as representing erasure.

In one embodiment of the invention, when the synchronization detection information indicates that any two or more data pieces from undetected synchronization data pieces and synchronization data pieces detected with a positional offset are consecutive, the erasure locator information generation section determines at least one second symbol provided between the consecutive synchronization data pieces as representing erasure.

An error correction method and a reproduction apparatus according to the present invention function as follows. When a first symbol included in a first coded data piece having a relatively high degree of redundancy is detected to have an error or when no synchronization data piece is detected, the second symbols which are provided in the vicinity of such a first symbol or the undetected synchronization data piece have a high probability of incorrect and thus are determined to represent erasure. When a synchronization data piece is detected with a positional offset, symbols included in the coded data pieces located before such a synchronization data piece have a high probability of being incorrect and thus is determined to represent erasure. Symbols included in the coded data pieces located after such a synchronization data piece have a high probability of being correct and thus is determined not to represent erasure. When at least two of the undetected synchronization data pieces and synchronization data pieces detected with a positional offset are consecutive, data pieces which are read before the next correctly detected synchronization data piece have a high probability of being incorrect. Thus, symbols included in all the coded data pieces between those consecutive synchronization data pieces are determined to represent erasure. Owing to these methods, erasure positions can be determined with higher precision, and thus the error correction capability can be improved.

An error correction method and a reproduction apparatus according to the present invention are useful for, for example, error correction of composite coded data.

Thus, the invention described herein makes possible the advantages of providing an error correction method which is effective for generating erasure locator information using a result of error correction of a first coded data piece or a result of detection of a synchronization data piece and for performing erasure error correction of a second coded data piece using the erasure locator information, and a reproduction apparatus for carrying out such an error correction method.

These and other advantages of the present invention will become apparent to those skilled in the art upon reading and understanding the following detailed description with reference to the accompanying figures.

DESCRIPTION OF THE PREFERRED EMBODIMENTS

Hereinafter, the present invention will be described by way of illustrative examples with reference to the accompanying drawings.

EXAMPLE 1

An error correction method according to a first example of the present invention will be described. In the following description, the composite coded data piece 203 shown in FIG. 2 will be used as an example of the composite coded data piece.

Figure 1:
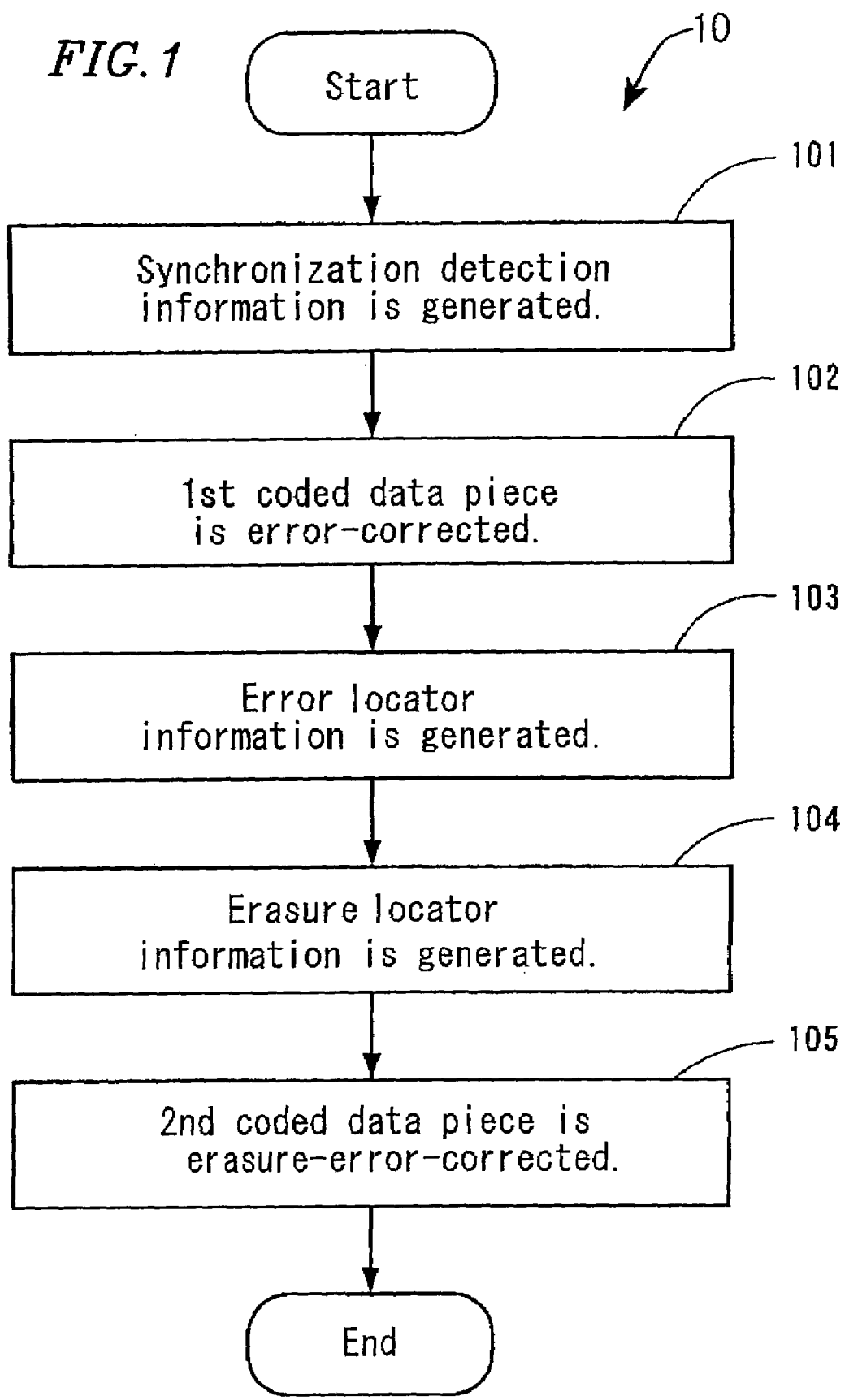
FIG. 1 is a flowchart illustrating an error correction method of a composite coded data piece according to a first example of the present invention.

FIG. 1 is a flowchart 10 illustrating an error correction method of the composite coded data piece 203 in this example.

In step 101, the states of the synchronization data pieces 204 and 205 are detected in the order of data pieces which have been recorded. Thus, synchronization detection information representing the detection result is generated. When, for example, a synchronization data piece is detected, the synchronization detection information associated with that synchronization data piece indicates "0". When no synchronization data piece is detected, the synchronization detection information associated with that synchronization data piece indicates "1". When a synchronization data piece is detected with a positional offset, the synchronization detection information associated with that synchronization data piece indicates "2".

In step 102, the first coded data piece 201 is error-corrected. In step 103, error location information representing the position of an error of the first coded data piece 201 is generated. Since the first coded data piece 201 is positioned after being interleaved, the error correction is performed on a first coded data piece 201 which has been de-interleaved. As described above, de-interleaving is the opposite transform to interleaving. In this manner, the first coded data pieces 206 through 211 are error-corrected. This will be described in detail below.

In step 104, erasure locator information representing the position of erasure of the second coded data piece 202 is generated using the synchronization detection information and the error location information generated in steps 101 and 103. This will be described in detail below.

In step 105, the second coded data piece 202 is erasure-error-corrected using the erasure locator information generated in step 104.

Figure 8:
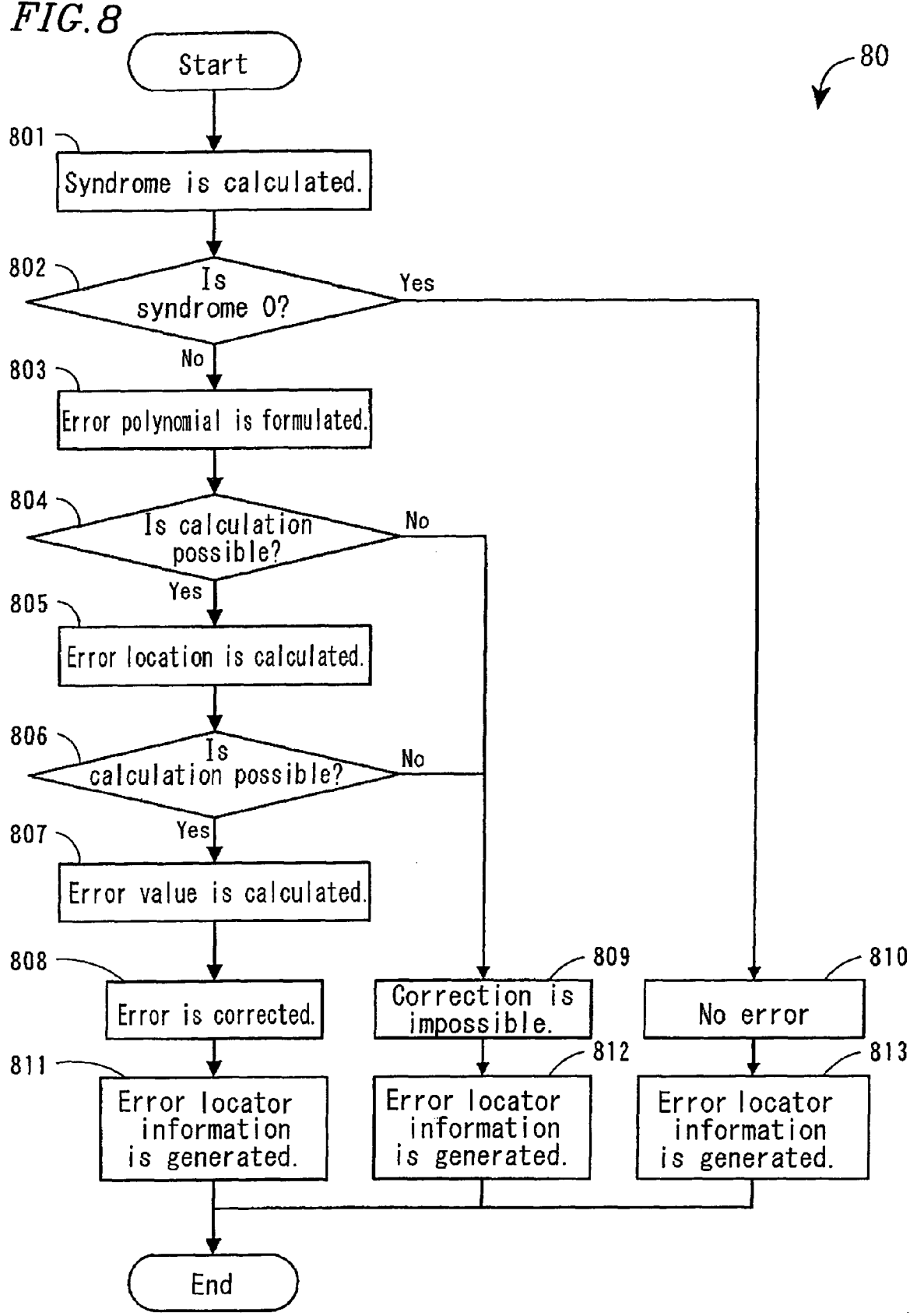
FIG. 8 is a flowchart of a method for correcting an error of the first coded data piece and generating error location information according to the first example of the present invention.

FIG. 8 is a flowchart 80 illustrating an exemplary method for correcting the error of the first coded data piece 201 and generating error location information as performed in steps 102 and 103 in FIG. 1.

In step 801, a syndrome representing position information for specifying a position of an error is calculated. A data piece R to be error-corrected is:

$$R=(A[0]A[1] \ldots A[60]A[61]) \qquad \text{expression 3}$$

In this expression, A[i] (i=0 through 61) represents 1 byte, which corresponds to 8 bits. Here, the data size of one symbol is 1 byte. A[0] through A[29] represent a data portion, and A[30] through A[61] represent a parity portion. Syndrome $S_j$ is defined as:

$$S_j=R(\alpha^j)=A[0]\alpha^{61j}+A[1]\alpha^{60j}+ \ldots +A[60]\alpha^j+A[61] \qquad \text{expression 4}$$

Here, j=0 through 31.

In step 802, it is determined whether syndrome $S_j$ is 0 or not. When syndrome $S_j$ is 0, the processing advances to step 810. In step 810, it is determined that all the symbols A[i] (i=0 through 61) included in the data piece R are correct. In step 813, error location information representing "0" regarding all the symbols A[i] (i=0 through 61) is generated. When syndrome $S_j$ is not 0 in step 802, the processing advances to step 803.

In step 803, an error locator polynomial is formulated using syndrome $S_j$. The error locator polynomial has, as a root, the reciprocal number of error locations L1, L2, ... Lm (m is the number of errors) and is expressed by:

$$\alpha(x) = (1 - \alpha^{L1}x)(1 - \alpha^{L2}x) \ldots (1 - \alpha^{Lm}x) \qquad \text{expression 5}$$
$$= \sigma_m x^m + \sigma_{m-1} x^{m-1} + \ldots + \sigma_1 x + 1$$

Each coefficient of the error locator polynomial is defined by syndrome $S_j$. The coefficient of the error locator polynomial is found using Peterson's method, the Euclidean method, or an algorithm such as the BM method. Peterson's method solves the simultaneous equations realized between the coefficient of the error locator polynomial and syndrome $S_j$, using a matrix. The Euclidean method is a sequential calculation method of solving such simultaneous equations using a polynomial.

When the coefficient of the error locator polynomial is found in step 804, the processing advances to step 805. When the coefficient is not found, the processing advances to step 809. In step 809, it is determined that a larger number of errors than can be corrected are generated. In step 812, error location information representing "1" regarding all the symbols A[i] (i=0 through 61) is generated.

In step 805, α to the −ith power (i=0 through 61, and α is the root of the primitive polynomial (expression 1)) is substituted into the error locator polynomial. Thus, the value of "k", at which the solution of the error locator polynomial is 0, is found. In this way, the position of the incorrect data piece (i.e., the error location) is found. The symbol corresponding to the error location is represented as:

$$A[61-k] \qquad \text{expression 6.}$$

In step 806, it is determined whether or not a calculation for finding the error location can be performed. When it is determined that the calculation can be performed in step 806, the processing advances to step 807. When it is determined that the calculation cannot be performed in step 806, error location information representing "1" regarding all the symbols A[i] (i=0 through 61) is generated.

In step 807, an error value is calculated by solving the simultaneous equations between the error location found in steps 805 and 806 and syndrome $S_j$.

In step 808, symbol A[61−k] is error-corrected by subtracting the error value obtained in step 807 from the value represented by symbol A[61−k] corresponding to the error location found in steps 805 and 806. In step 811, error location information representing "1" regarding symbol A[61−k] is generated. By performing such error correction and generation of error location information, the first coded data piece 201 is error-corrected.

Figure 9:
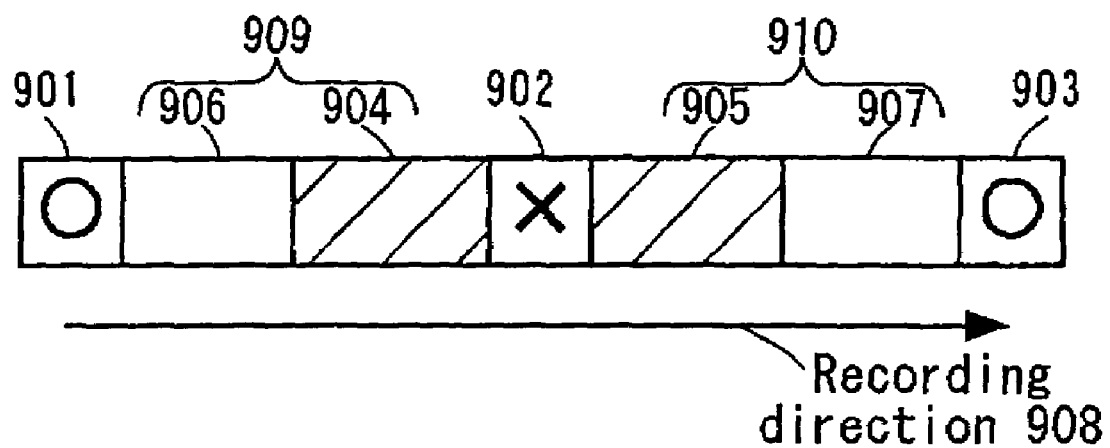
FIG. 9 shows a state of a synchronization data piece of a first symbol in the first example.
Figure 10:
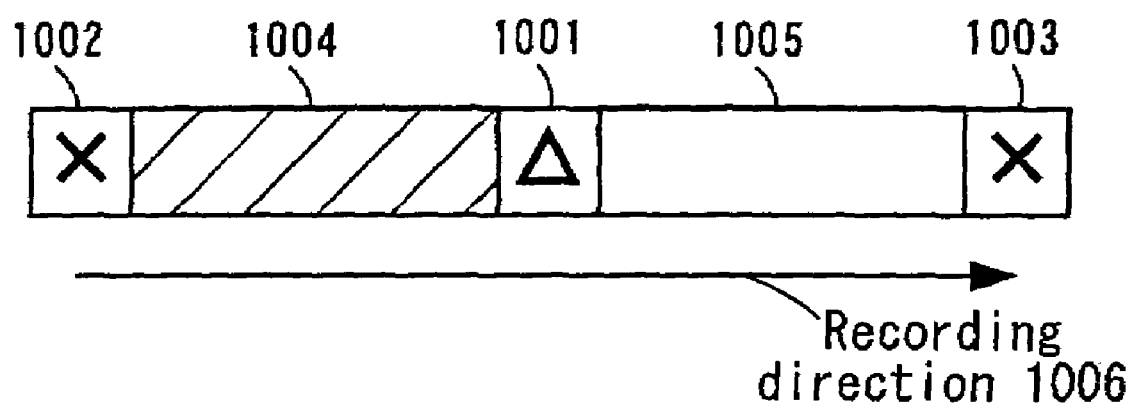
FIG. 10 shows another state of the synchronization data piece of the first symbol in the first example.
Figure 11:
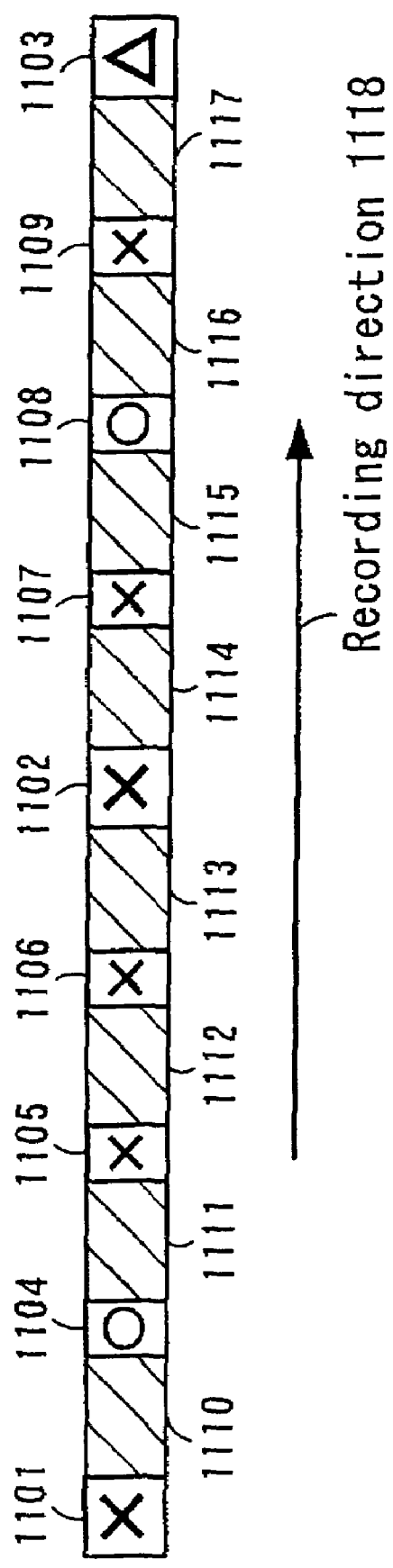
FIG. 11 shows still another state of the synchronization data piece of the first symbol in the first example.

Hereinafter, a method for generating erasure locator information in step 104 in FIG. 1 will be described in detail. Extinction position information is generated by reading and using synchronization detection information of synchronization data pieces positioned before and after the second coded data piece for which erasure locator information is to be generated, and/or error location information of first coded data pieces positioned before and after the second coded data piece for which erasure locator information is to be generated. In this example, a method for generating erasure locator information in the case where the synchronization data pieces and the first symbols are in the state shown in FIGS. 9 through 11. FIGS. 9 through 11 show a portion of the data corresponding to one row (or a plurality of rows), in a recording direction, of the composite corrected data piece 203 which is arranged in rows and columns.

In FIG. 9, mark "X" indicates a synchronization data piece, the synchronization detection information of which represents "1", or a first symbol, the error location information of which represents "1". Mark "○" indicates a synchronization data piece, the synchronization detection information of which represents "0", or a first symbol, the error location information of which represents "0".

In one embodiment, an Nth first symbol 901, an (N+1)th first symbol 902, and an (N+2)th first symbol 903 are arranged in a recording direction 908. Here, "N" is an integer. It is assumed that no error is detected in the Nth first symbol 901 and the (N+2)th first symbol 903 but an error is detected in the (N+1)th first symbol 902. In this case, at least one of a plurality of second symbols provided immediately on both sides of the (N+1)th first symbol 902 is determined to represent erasure. Thus, erasure locator information representing such a determination result is generated.

As shown in FIG. 9, a second coded data piece 909 is arranged between the Nth first symbol 901 and the (N+1)th first symbol 902. The second coded data piece 909 is divided into two portions, i.e., partial second coded data pieces 904 and 906 in accordance with the number of second symbols which are determined to represent erasure. The partial second coded data pieces 904 and 906 each include at least one second symbol. For generating erasure locator information, at least one second symbol included in the partial second coded data piece 904 provided adjacent to the (N+1)th first symbol 902 is determined to represent erasure. At least one second symbol included in the partial second coded data piece 906 provided adjacent to the Nth first symbol 901 is determined not to represent erasure.

A second coded data piece 910 is arranged between the (N+1)th first symbol 902 and the (N+2)th first symbol 903. The second coded data piece 910 is divided into two portions, i.e., partial second coded data pieces 905 and 907 in accordance with the number of second symbols which are determined to represent erasure. The partial second coded data pieces 905 and 907 each include at least one second symbol. For generating erasure locator information, at least one second symbol included in the partial second coded data piece 905 provided adjacent to the (N+1)th first symbol 902 is determined to represent erasure. At least one second symbol included in the partial second coded data piece 907 provided adjacent to the (N+2)th first symbol 903 is determined not to represent erasure.

The number of second symbols which are determined to represent erasure is arbitrary. For example, half of the plurality of second symbols included in each of the second coded data pieces 909 and 910 which are held between the synchronization data pieces and/or the first coded data pieces may be determined to represent erasure. Alternatively, all such a plurality of second symbols may be determined to represent erasure.

A second symbol determined to represent erasure is associated with erasure locator information representing "1". A second symbol determined not to represent erasure is associated with erasure locator information representing "0".

In another embodiment, the data pieces 901, 902 and 903 may be synchronization data pieces. In this case also, at least one of the plurality of second symbols arranged immediately on both sides of the (N+1)th synchronization data piece 902 is determined to represent erasure. Thus, erasure locator information representing such a determination result is generated.

For example, at least one second symbol included in the partial second coded data piece 904 adjacent to the (N+1)th synchronization data piece 902 is determined to represent erasure. At least one second symbol included in the partial second coded data piece 906 adjacent to the Nth synchronization data piece 901 is determined not to represent erasure.

In addition, for example, at least one second symbol included in the partial second coded data piece 905 adjacent to the (N+1)th synchronization data piece 902 is determined to represent erasure. At least one second symbol included in the partial second coded data piece 907 adjacent to the (N+2)th synchronization data piece 903 is determined not to represent erasure. In this case also, the number of second symbols determined to represent erasure is arbitrary.

In still another embodiment, at least one of the data pieces 901, 902 and 903 (for example, the data piece 901) may be a synchronization data piece. The other data pieces are first symbols. In this case also, the erasure locator information is generated in the same procedure as that described above. (The detailed description of the procedure will not be repeated.)

Figure 7:
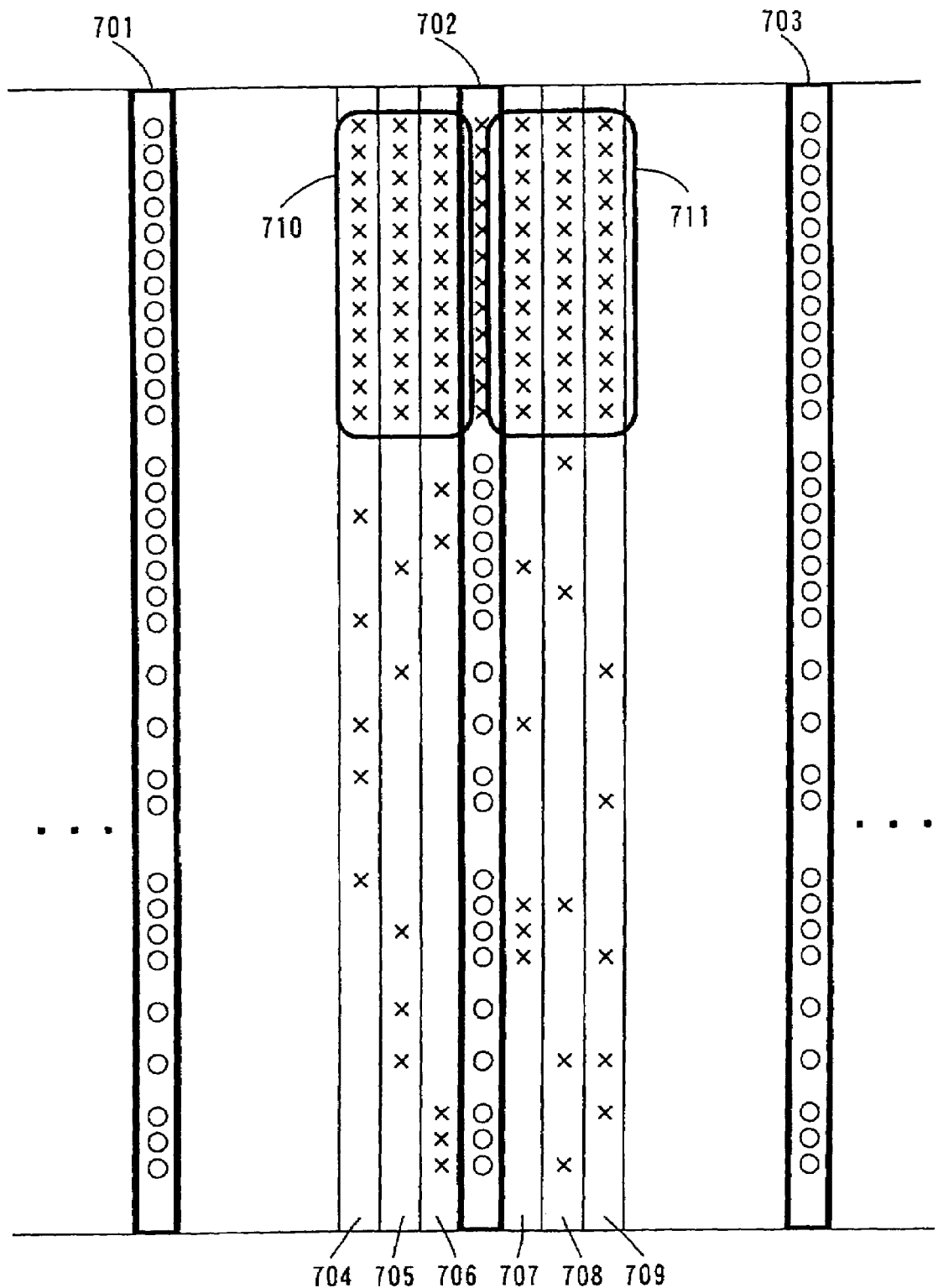
FIG. 7 shows an exemplary pattern of errors of the composite coded data piece.

The above-described method can be applied as follows to the case where the errors as shown in FIG. 7 occur. The second symbols located in error location areas 710 and 711 are determined to represent erasure. As a result of this determination, the partial second coded data pieces 704 through 709 each include 12 second symbols determined to represent erasure and 5 second symbols determined to represent an error. The total number of the symbols determined to represent erasure and the total number of the symbols determined to represent an error are each in the range of expression 2. Thus, error correction is possible.

In the case where error location information (or synchronization detection information) indicates that an error is detected in both of the two first symbols adjacent to each other (or two synchronization data pieces adjacent to each other), all the second symbols arranged between the two first symbols (or the two synchronization data pieces) are determined to represent erasure.

Next, another method for generating erasure locator information will be described with reference to FIG. 10.

In FIG. 10, mark "X" indicates a synchronization data piece, the synchronization detection information of which represents "1", or a first symbol, the error location information of which represents 1". Mark "Δ" indicates a synchronization data piece, the synchronization detection information of which represents "2" (i.e., a synchronization data piece detected with a positional offset).

In one embodiment, an Nth synchronization data piece 1002, an (N+1)th synchronization data piece 1001, and an (N+2)th synchronization data piece 1003 are arranged in a recording direction 1006. At least a second coded data piece 1004 is provided between the Nth synchronization data piece 1002 and the (N+1)th synchronization data piece 1001. At least a second coded data piece 1005 is provided between the (N+1)th synchronization data piece 1001 and the (N+2)th synchronization data piece 1003. The second encoded data pieces 1004 and 1005 each include at least one second symbol. When, as shown in FIG. 10, the (N+1)th synchronization data piece 1001 is detected with a positional offset, at least one second symbol provided between the Nth synchronization data piece 1002 and the (N+1)th synchronization data piece 1001 is determined to represent erasure. At least one second symbol provided between the (N+1)th synchronization data piece 1001 and the (N+2)th synchronization data piece 1003 is determined not to represent erasure. The reason is that symbols located before the synchronization data piece detected with a positional offset are incorrect with a high probability, and symbols located after the synchronization data piece detected with a positional offset are correctly reproduced with a high probability.

In another embodiment, the data pieces 1002 and 1003 may be first symbols. The first symbol 1002 is provided between the Nth synchronization data piece and the (N+1)th synchronization data piece 1001, and the first symbol 1003 is provided between the (N+1)th synchronization data piece 1001 and the (N+2)th synchronization data piece. In this case also, at least one second symbol provided between the first symbol 1002 and the (N+1)th synchronization data piece 1001 is determined to represent erasure. At least one second symbol provided between the (N+1)th synchronization data piece 1001 and the first symbol 1003 is determined not to represent erasure.

The second symbol determined to represent erasure is associated with erasure locator information representing "1". The second symbol determined not to represent erasure is associated with erasure locator information representing "0".

Using this method for generating erasure locator information, a symbol located before a synchronization data piece and having a high probability of being incorrect can be determined to represent erasure. Thus, the number of symbols which can be corrected, among incorrect symbols, is increased. This improves the error correction capability. Also using this method, a symbol located after a synchronization data piece and having a high probability of being correctly reproduced can be determined not to represent erasure. Thus, correct symbols are not determined to represent erasure. As a result, the number of unnecessary erasure positions is reduced, and effective erasure error correction can be performed. This further improves the error correction capability.

Still another method for generating erasure locator information will be described with reference to FIG. 11.

In FIG. 11, mark "X" indicates a synchronization data piece, the synchronization detection information of which represents "1" and/or a first symbol, the error location information of which represents 1". Mark "○" indicates a synchronization data piece, the synchronization detection information of which represents "0" and/or a first symbol, the error location information of which represents 0". Mark "Δ" indicates a synchronization data piece, the synchronization detection information of which represents "2".

When no synchronization data piece is detected, data pieces which are read before the next time a synchronization data piece is correctly detected have a high probability of being incorrect. Therefore, when any two or more data pieces from the undetected synchronization data pieces and the synchronization data pieces detected with a positional offset are consecutive, at least one first symbol and at least one second symbol provided between the consecutive synchronization data pieces are determined to represent erasure.

In one embodiment, synchronization data pieces 1101 and 1102, the synchronization detection information of which represent "1", are consecutive in a recording direction 1118. In this case, even when a first symbol 1104, the error location information of which represents "0", exists between the synchronization data pieces 1101 and 1102, it is regarded that information represented by the first symbol 1104 accidentally matches a correct code word. Thus, the first symbol 1104 is determined to represent erasure. The second symbols included in each of second coded data pieces 1110, 1111, 1112 and 1113 between the synchronization data pieces 1101 and 1102 are determined to represent erasure. The second symbols determined to represent erasure are each associated with erasure locator information representing "1".

In addition in FIG. 11, the synchronization data pieces 1102, the synchronization detection information of which represent "1", and a synchronization data piece, the synchronization detection information of which represent "2", are consecutive in the recording direction 1118. In this case, even when a first symbol 1108, the error location information of which represents "0", exists between the synchronization data pieces 1102 and 1103, it is regarded that information represented by the first symbol 1108 accidentally matches a correct code word. Thus, the first symbol 1108 is determined to represent erasure. The second symbols included in each of the second coded data pieces 1114, 1115, 1116 and 1117 between the synchronization data pieces 1102 and 1103 are determined to represent erasure. The second symbols determined to represent erasure are each associated with erasure locator information representing "1". The first symbols 1105, 1106, 1107 and 1109 are first symbols determined to be incorrect.

Using this method for generating erasure, a first symbol, which is not determined to be incorrect by the conventional methods because it accidentally represents information matching the correct code word despite the fact that it is actually incorrect, can now be determined to be incorrect. Thus, a second symbol can now be correctly determined as representing erasure, while the conventional methods fail in this because the incorrect first symbol is detected as being correct. Therefore, the number of symbols which can be corrected, among incorrect symbols, is increased. This improves the error correction capability. Since the erasure error correction can be performed with higher certainty, the erasure error correction capability is improved.

Figure 12:
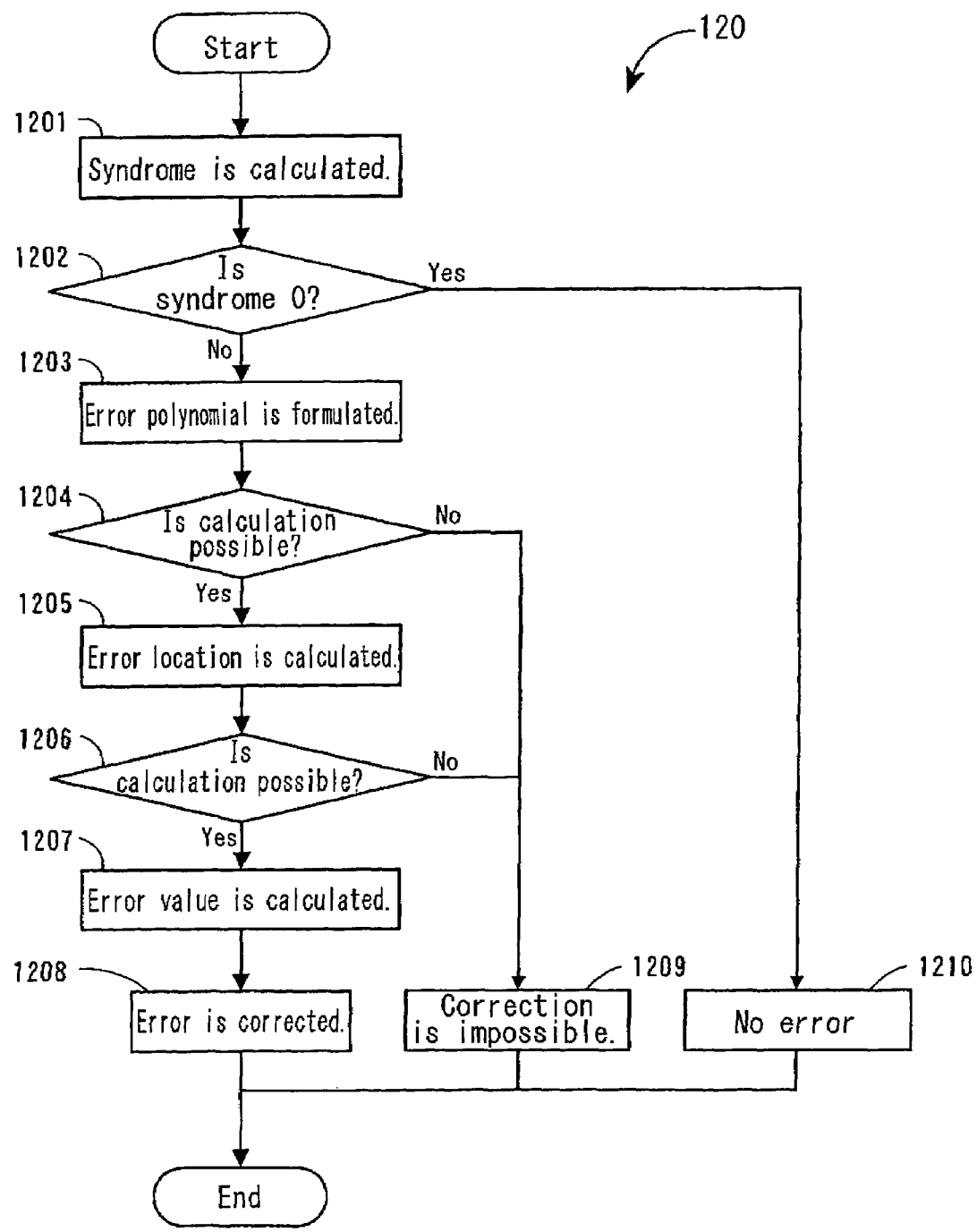
FIG. 12 is a flowchart of a method for correcting an erasure error of a second coded data piece according to the first example.

FIG. 12 is a flowchart 120 illustrating an exemplary method for correcting the erasure error of the second coded data piece 202 as performed in step 105 in FIG. 1.

In step 1201, a syndrome representing position information for specifying a position of an error is calculated. A data piece R to be erasure-error-corrected is:

$$R=(B[0]B[1] \ldots B[246]B[247])\qquad \text{expression 7}$$

In this expression, B[i] (i=0 through 247) represents 1 byte, which corresponds to 8 bits. Here, the data size of one symbol is 1 byte. B[0] through B[215] represent a data portion which show a content (for example, video) or the like, and B[216] through B[247] represent a parity portion. Syndrome $S_j$ is defined as:

$$S_j=R(\alpha^j)=B[0]\alpha^{247j}+B[1]\alpha^{246j}+ \ldots +B[246]\alpha^j+B[247]\qquad \text{expression 8}$$

Here, j=0 through 31.

In step 1202, it is determined whether syndrome $S_j$ is 0 or not. When syndrome $S_j$ is 0, the processing advances to step 1210. In step 1210, it is determined that all the symbols B[i] (i=0 through 247) included in the data piece R are correct, and the erasure error correction is terminated. When syndrome $S_j$ is not 0 in step 1202, the processing advances to step 1203.

In step 1203, an error locator polynomial is formulated using syndrome $S_j$ and the erasure locator information. The error locator polynomial has, as a root, the reciprocal number of error locations L1, L2, ... Lm (m is the number of errors+the number of erasures) and is represented by expression 5 above.

The coefficient of the error locator polynomial is defined by syndrome $S_j$ and the erasure locator information. The coefficient of the error locator polynomial is found using Peterson's method, the Euclidean method, or an algorithm such as the BM method. Peterson's method solves the simultaneous equations realized between the coefficient of the error locator polynomial, syndrome $S_j$, and the erasure locator information, using a matrix. The Euclidean method is a sequential calculation method of solving such simultaneous equations using a polynomial.

When the coefficient of the error locator polynomial is found in step 1204, the processing advances to step 1205. When the coefficient is not found, the processing advances to step 1209. In step 1209, it is determined that a larger number of errors than can be corrected are generated. Thus, it is determined that the correction is impossible and the erasure error correction procedure is terminated.

In step 1205, α to the −ith power (i=0 through 247, and α which is the root of the primitive polynomial (expression 1)) is substituted into the error locator polynomial. Thus, the value of "k", at which the solution of the error locator polynomial is 0, is found. In this way, the position of the incorrect data piece (i.e., the error location) is found. The symbol corresponding to the error location is represented as:

$$B[247-k]\qquad \text{expression 9.}$$

In step 1206, it is determined whether or not a calculation for finding the error location can be performed. When it is determined that the calculation can be performed in step 1206, the processing advances to step 1207. When it is determined that the calculation cannot be performed in step 1206, it is determined that correction is impossible and the erasure error correction procedure is terminated in step 1209.

In step 1207, an error value is calculated by solving the simultaneous equations between the error location found in steps 1205 and 1206, syndrome $S_j$ and the erasure locator information.

In step 1208, symbol B[247−k] is erasure-error-corrected by subtracting the error value obtained in step 1207 from the data value corresponding to the error location found in steps 1205 and 1206. Then, the erasure error correction is terminated.

As described above, in the first example, when an error is detected in a first symbol included in a first coded data piece having a high degree of redundancy or when no synchronization data piece is detected (FIG. 9), second symbols provided in the vicinity of such a first symbol or the undetected synchronization data piece have a high probability of being incorrect and thus are determined to represent erasure. When a synchronization data piece is detected with a positional offset (FIG. 10), symbols included in a coded data piece provided before that synchronization data piece have a high probability of being incorrect and thus are determined to represent erasure, and symbols included in a coded data piece provided after that synchronization data piece have a low probability of being incorrect and thus are determined not to represent erasure. When undetected synchronization data pieces and/or synchronization data pieces detected with a positional offset are consecutive (FIG. 11), the data pieces, which are read before the next correctly detected synchronization data piece, have a high probability of being incorrect. Therefore, symbols included in all the coded data pieces between those consecutive synchronization data pieces are determined to represent erasure. Owing to these methods, erasure positions can be determined with higher precision, and thus the error correction capability can be improved.

EXAMPLE 2

An error correction method according to a second example of the present invention will be described. In the following description, the composite coded data piece 203 shown in FIG. 2 will be used as an example of the composite coded data piece.

Figure 13:
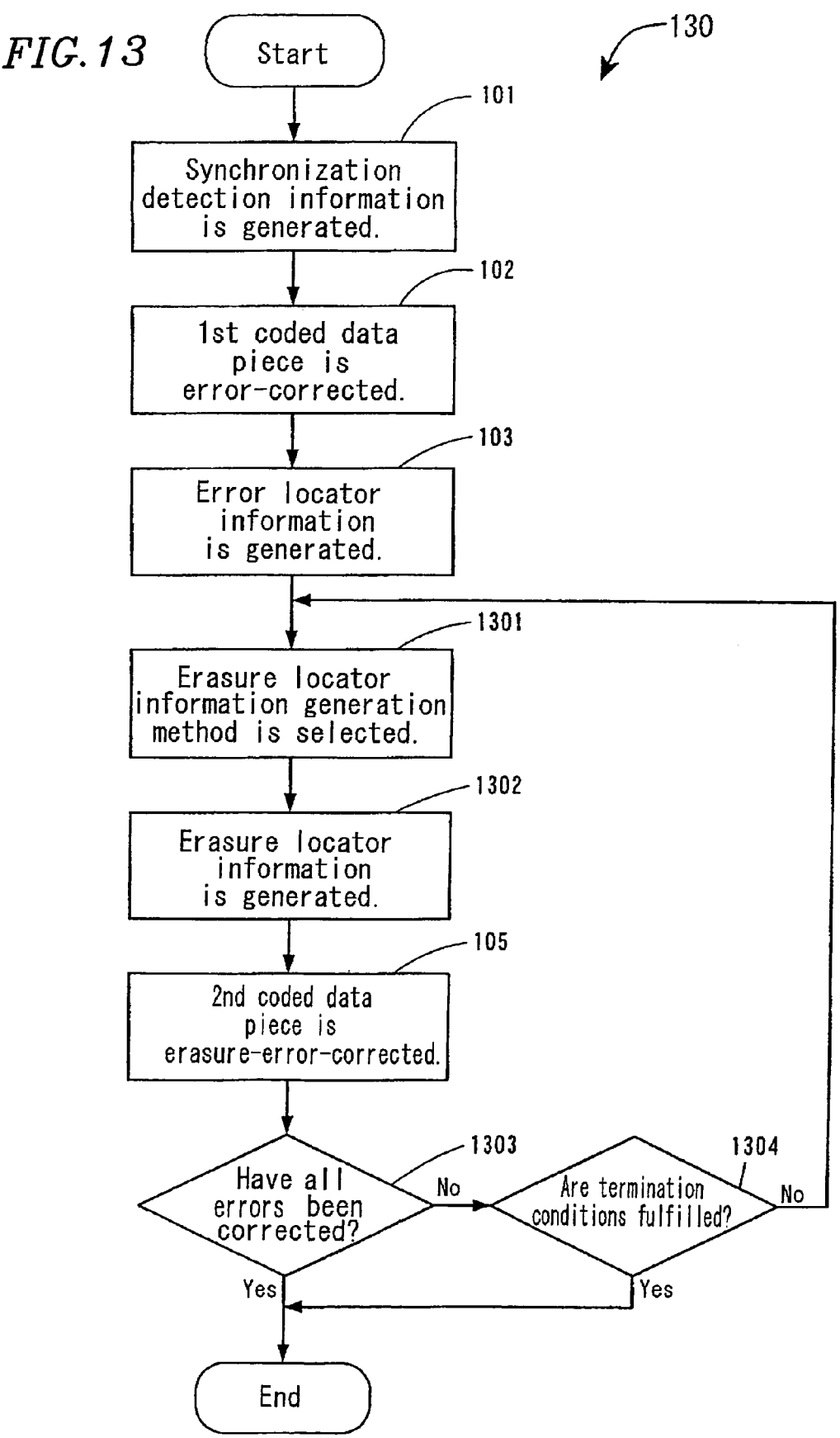
FIG. 13 is a flowchart illustrating an error correction method of a composite coded data piece according to a second example of the present invention.

FIG. 13 is a flowchart 130 illustrating an error correction method of the composite coded data piece 203 in this example. Identical steps previously discussed with respect to FIG. 1 bear identical reference numerals and the detailed descriptions thereof will be omitted.

The flowchart 130 is different from the flowchart 10 in FIG. 1 in that in flowchart 130, when the second coded data piece is not error-corrected, erasure error correction is performed repeatedly using erasure locator information which is generated by a different erasure locator information generation method. In this example, erasure error correction is performed repeatedly until all the errors are corrected or termination conditions are fulfilled.

Hereinafter, erasure error correction will be described which uses a first erasure locator information generation method, a second erasure locator information generation method, and a third erasure locator information generation method and is terminated when all the first, second and third erasure locator information generation methods are used (termination conditions). These three erasure locator information generation methods are, for example, described with reference to FIGS. 9, 10 and 11.

Steps 101, 102 and 103 are performed. Then, in step 1301, the first erasure locator information generation method is first selected.

In step 1302, the first erasure locator information generation method is carried out using the synchronization detection information and the error location information generated in steps 101 and 103. Thus, first erasure locator information is generated.

In step 105, the second coded data piece is erasure-error-corrected using the first erasure locator information generated in step 1302. The post-correction second coded data piece is referred to as a "first corrected data piece".

In step 1303, it is determined whether all the errors have been corrected or not. When the second coded data piece includes an uncorrected error in step 1303, the processing advances to step 1304. When all the errors have been corrected in step 1303, the error correction procedure is terminated.

In step 1304, it is determined that the termination conditions are not fulfilled since only one erasure error location information generation method has been used. The processing returns to step 1301, where the second erasure error location information generation method is selected. The second erasure error location information generation method is different from the first erasure error location information generation method already used.

In step 1302, the second erasure locator information generation method is carried out using the synchronization detection information and the error location information generated in steps 101 and 103. Thus, second erasure locator information is generated.

In step 105, the first corrected data piece is erasure-error-corrected using the second erasure locator information generated in step 1302. The post-correction first corrected data piece is referred to as a "second corrected data piece".

In step 1303, it is determined whether all the errors have been corrected or not. When the first corrected data piece includes an uncorrected error in step 1303, the processing advances to step 1304. When all the errors have been corrected in step 1303, the error correction procedure is terminated.

In step 1304, it is determined that the termination conditions are not fulfilled since only two erasure error location information generation methods have been used. The processing returns to step 1301, where the third erasure error location information generation method is selected. The third erasure error location information generation method is different from the first erasure error location information generation method and the second erasure error location information generation method already used.

In step 1302, the third erasure locator information generation method is carried out using the synchronization detection information and the error location information generated in steps 101 and 103. Thus, third erasure locator information is generated.

In step 105, the second corrected data piece is erasure-error-corrected using the third erasure locator information generated in step 1302. The post-correction second corrected data piece is referred to as a "third corrected data piece".

In step 1303, it is determined whether all the errors have been corrected or not. When the second corrected data piece includes an uncorrected error in step 1303, the processing advances to step 1304. When all the errors have been corrected in step 1303, the error correction procedure is terminated.

In step 1304, it is determined that the termination conditions are fulfilled since three erasure error location information generation methods have been used. Thus, the error correction procedure is terminated.

In the second example, three erasure error location information generation methods are used. The number of erasure error location information generation methods used is arbitrary as long as it is two or more. Any erasure error location information generation method which can generate erasure error location information is usable.

In step 1301 of the second example, the erasure error location information generation methods are selected in the order of first, second and third erasure error location information generation methods. When all the errors are not corrected in step 105, even an erasure error location information generation method which has already been used can be selected as long as it is not the one which was used immediately previously. When all of the errors can be corrected using a certain erasure error location information generation method, the same erasure error location information generation method can be selected as the first erasure error location information generation method used for a different second coded data piece. For example, when all the errors can be corrected using the first erasure error location information, the first erasure error location information generation method can be used for erasure error correction of a different second coded data piece. When all the errors can be corrected using the second erasure error location information, the second erasure error location information generation method can be used for erasure error correction of a different second coded data piece.

In the second example, the second and third erasure error correction is performed on the first corrected data piece and the second corrected data piece. Alternatively, the erasure error correction may be performed on the uncorrected second coded data piece.

In the second example, the procedure is terminated when all three of the erasure error location information generation methods are used. This may be modified in various ways. For example, any possible combination of the three erasure error location information generation methods may be performed in any possible order, or the three erasure error location information generation methods maybe repeated until no correction is made.

As described above, in the second example, when erasure error correction is performed using erasure error location information generated by one erasure error location information generation method but there is at least one error which cannot be corrected, erasure error correction is performed in repetition using erasure error location information generated by another erasure error location information generation method. Thus, errors which cannot be corrected by performing erasure error correction once can be corrected. This improves the error correction capability.

EXAMPLE 3

Figure 14:
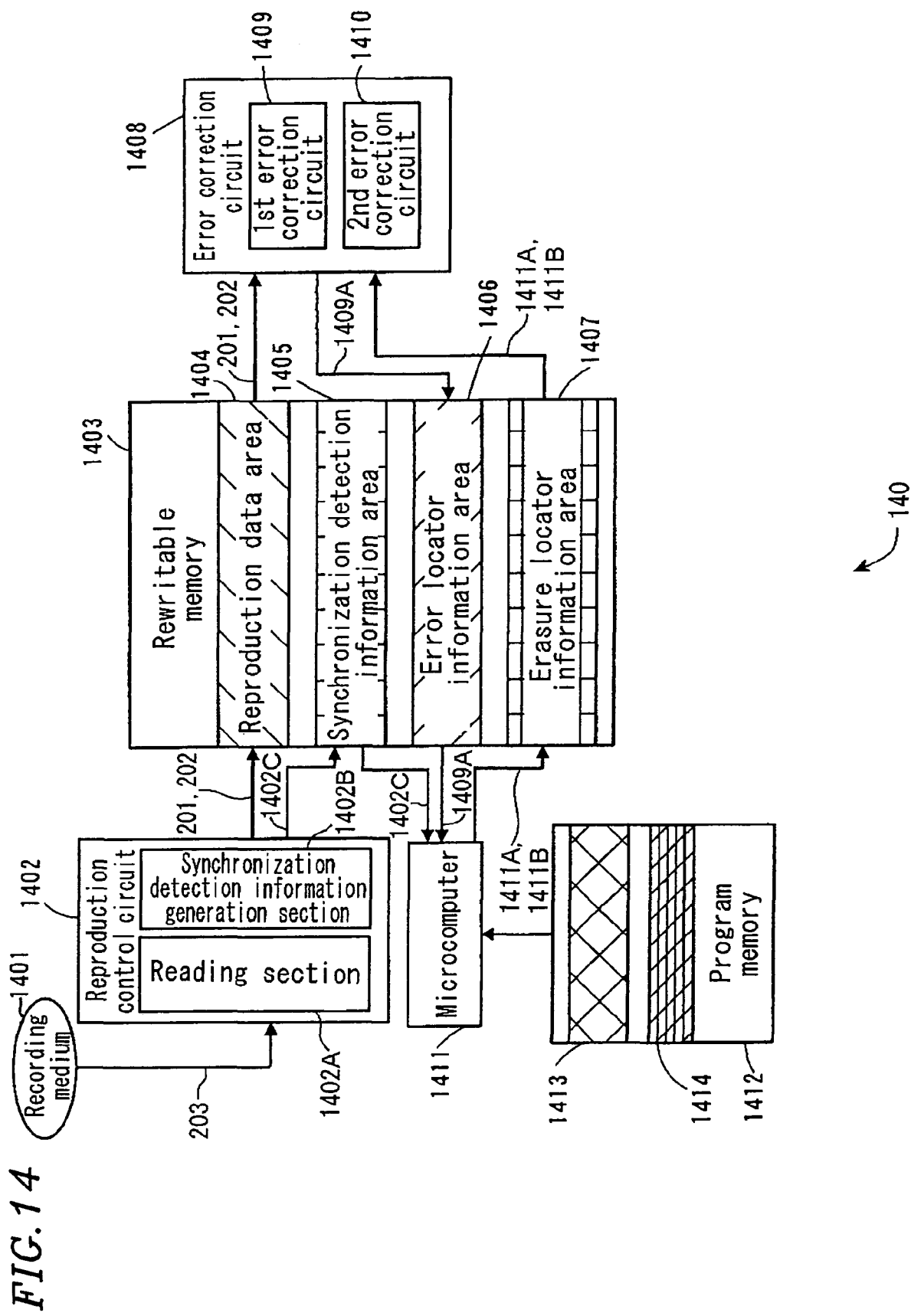
FIG. 14 shows an exemplary structure of an information reproduction apparatus according to a third example of the present invention.

FIG. 14 shows a structure of an information reproduction apparatus 140 according to a third example of the present invention. The information reproduction apparatus 140 carries out the error correction methods described in the first and second examples. An exemplary operation of the information reproduction apparatus 140 for correcting the composite coded data piece 203 will be described, mainly using the error correction method shown in FIG. 13. FIGS. 1, 2, 8, 9, 10, 11 and 12 will also be referred to, but detailed descriptions thereof will not be repeated.

The information reproduction apparatus 140 includes a reproduction control circuit 1402, a rewritable memory 1403, an error correction circuit 1408, a microcomputer 1411, and a program memory 1412. A recording medium 1401 has the composite coded data piece 203 shown in FIG. 2 recorded thereon in the recording direction 202. The composite coded data piece 203 is merely an example of data which can be recorded on the recording medium 1401.

The reproduction control circuit 1402 includes a reading section 1402A for reading a composite coded data piece from the recording medium 1401 and outputting a first coded data piece, a second coded data piece, and a plurality of synchronization data pieces; and a synchronization detection information generation section 1402B for detecting the states of the plurality of synchronization data pieces and generating synchronization detection information representing the detection result.

The rewritable memory 1403 includes a reproduction data area 1404, a synchronization detection information area 1405, an error location information area 1406, and an erasure locator information area 1407. The error correction circuit 1408 includes a first error correction circuit 1409 and a second error correction circuit 1410. The first error correction circuit 1409 acts as an error location information generation section for error-correcting the first coded data piece and generating error location information representing an error location of the first coded data piece. The second error correction circuit 1410 acts as an erasure error correction section for erasure-error-correcting the second coded data piece based on the erasure locator information. The microcomputer 1411 acts as an erasure locator information generation section for generating erasure locator information representing an erasure position of the second coded data piece based on the error location information and the synchronization detection information.

As the rewritable memory 1403, a static memory (e.g., SRAM) which does not require a data storing operation or a dynamic memory (e.g. DRAM) which requires a data storing operation may be used. In the third example, the area of the rewritable memory 1403 is divided into a plurality of areas which are used as different memory areas. Alternatively, the information reproduction apparatus 140 may include a plurality of rewritable memories 140 for respectively storing different types of data.

The program memory 1412 includes an erasure locator information generation program 1413 and a termination condition branching program 1414.

The erasure locator information generation program 1413 causes the microcomputer 1411 to carry out the erasure locator information generation method described in steps 1301 and 1302 in FIG. 13. The microcomputer 1411 generates erasure locator information using the synchronization detection information and the error location information which are stored in the rewritable memory 1403, and stores the generated erasure locator information in the erasure locator information area 1407.

The termination condition branching program 1414 causes the microcomputer 1411 to carry out the termination condition determination described in steps 1303 and 1304 in FIG. 13. When it is determined that the termination conditions are fulfilled, the microcomputer 1411 terminates the error correction procedure. When it is determined that the termination conditions are not fulfilled, the microcomputer 1411 executes another erasure locator information generation method based on the erasure locator information generation program 1413.

The reading section 1402A included in the reproduction control circuit 1402 reads the composite coded data piece 203 from the recording medium 1401. When the reproduced first and second coded data pieces have been interleaved, the reading section 1402A de-interleaves these data pieces. The reproduced first and second coded data pieces 201 and 202 are stored in the reproduction data area 1404. The reproduction data area 1404 may be divided into an area for storing the first coded data piece 201 and an area for storing the second coded data piece 202. The synchronization detection information generation section 1402B included in the reproduction control circuit 1402 detects a plurality of synchronization data pieces including the synchronization data pieces 204 and 205. The synchronization detection information generation section 1402B then executes, for example, the synchronization detection information generation method described in step 101 in FIG. 1 so as to generate synchronization detection information 1402C. The synchronization detection information generation section 1402B stores the generated synchronization detection information 1402C in the synchronization detection information area 1405.

The first error correction circuit 1409 performs error correction on the first coded data piece 201 which is stored in the reproduction data area 1404. The first error correction circuit 1409 then executes, for example, the error location information generation method described in steps 811 through 813 in FIG. 8 so as to generate error location information 1409A. The first error correction circuit 1409 stores the generated error location information 1409A in the error location information area 1406. Any circuit may be used as the first error correction circuit 1409 as long as it can perform the processing shown in FIG. 8 on the first coded data piece 201 stored in the reproduction data area 1404 and store the generated error location information 1409A in the error location information area 1406.

The microcomputer 1411 analyzes and executes the erasure locator information generation program 1413 stored in the program memory 1412 so as to generate erasure locator information 1411A, and stores the generated erasure locator information 1411A in the erasure locator information area 1407. When being notified by the second error correction circuit 1410 that the error is not correctable, the microcomputer 1411 analyzes and executes the termination condition branching program 1414. When the termination conditions are determined to be fulfilled, the microcomputer 1411 terminates the error correction procedure. When the termination conditions are determined not to be fulfilled, the microcomputer 1411 analyzes and executes another erasure locator information generation method contained in the erasure locator information generation program 1413. Thus, the microcomputer 1411 generates another erasure locator information 1411B used for repeating erasure error correction and stores the erasure locator information 1411B in the erasure locator information area 1407.

The second error correction circuit 1410 performs erasure error correction of the second coded data piece 202 which is stored in the reproduction data area 1404 using the erasure locator information 1411A or the erasure locator information 1411B stored in the erasure locator information area 1407. The second error correction circuit 1410 notifies the error correction result to the microcomputer 1411. Any circuit may be used as the second error correction circuit 1410 as long as it can perform the processing shown in FIG. 12 on the second coded data piece 202 stored in the reproduction data area 1404 and notify the microcomputer 1411 whether error correction has been performed (step 1208 in FIG. 12), error correction is impossible (step 1209) or there is no error (step 1210).

Figure 2:
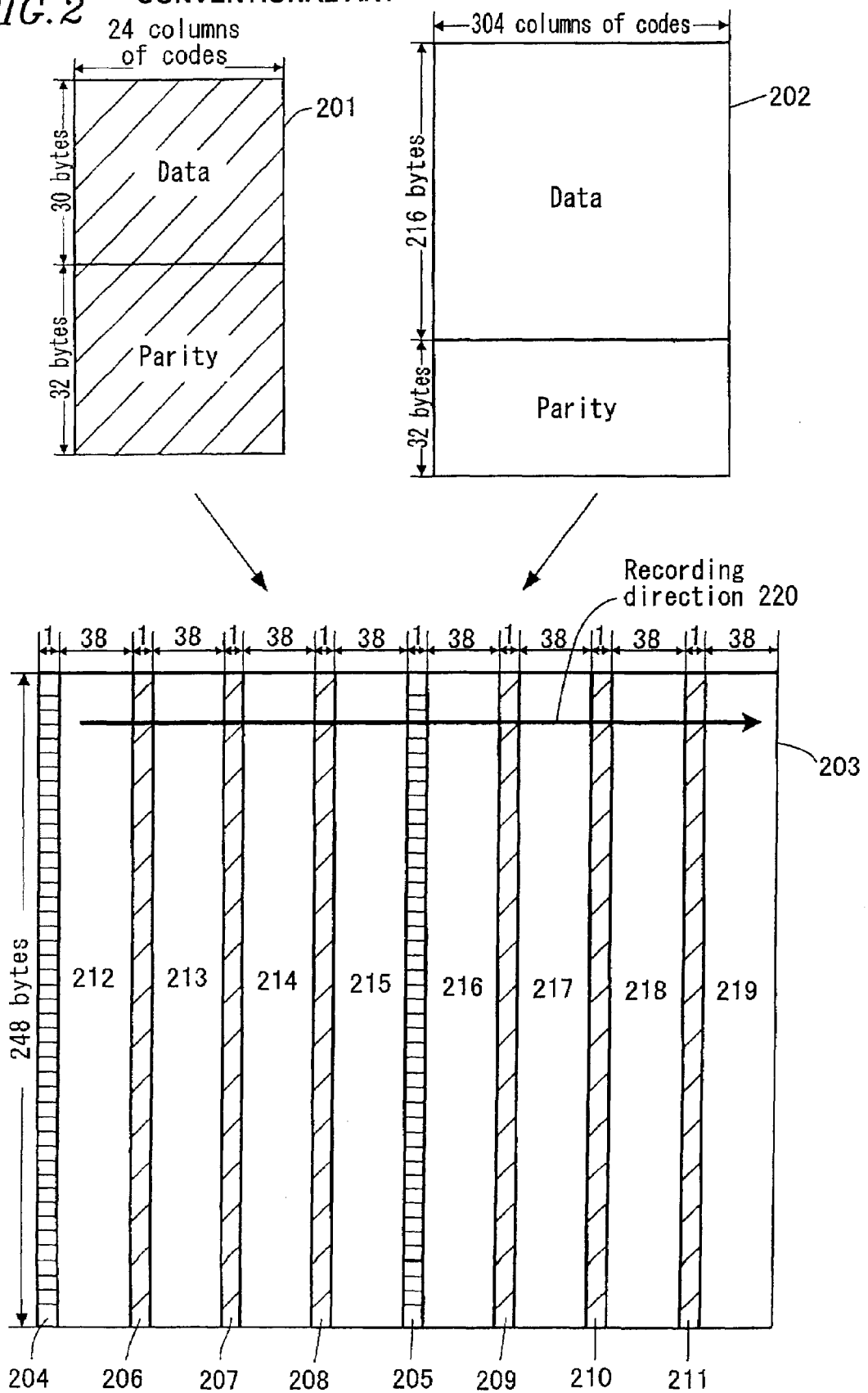
FIG. 2 shows a structure of a composite coded data piece.
Figure 3:
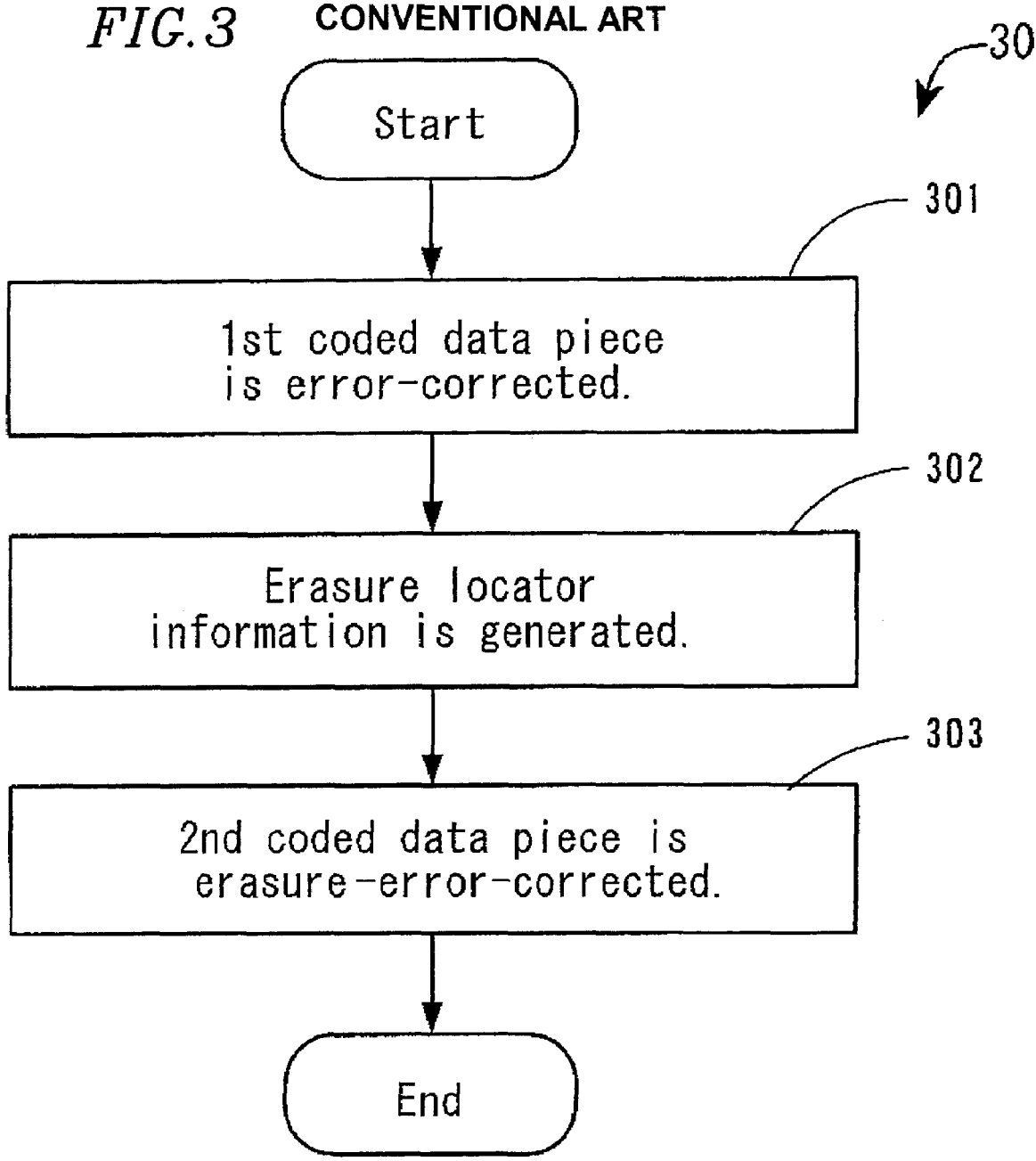
FIG. 3 is a flowchart illustrating an error correction method of a composite coded data piece.
Figure 4:
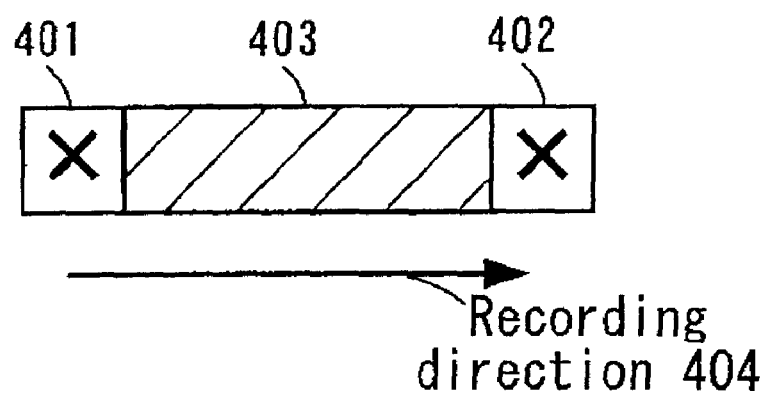
FIG. 4 shows a state of a synchronization data piece or a first symbol when a second coded data piece is determined to represent erasure in the error correction method.
Figure 5:
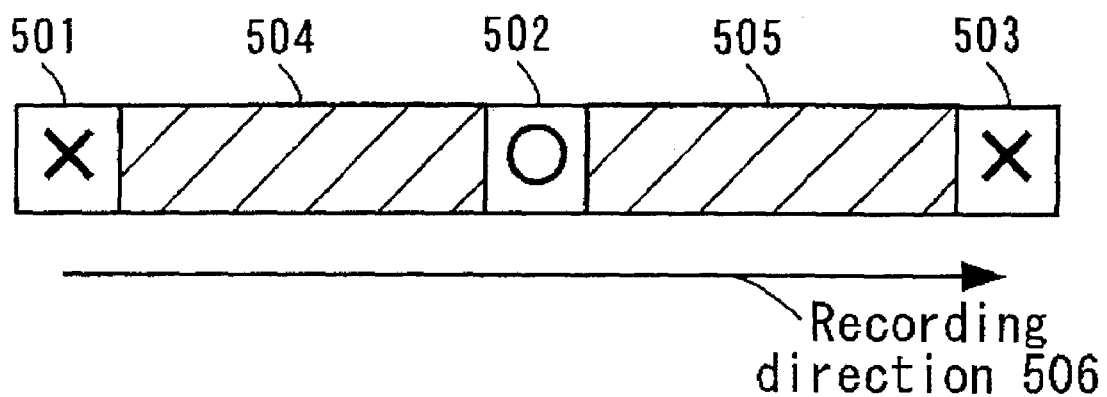
FIG. 5 shows another state of the synchronization data piece or the first symbol when the second coded data piece is determined to represent erasure in the error correction method.
Figure 6:
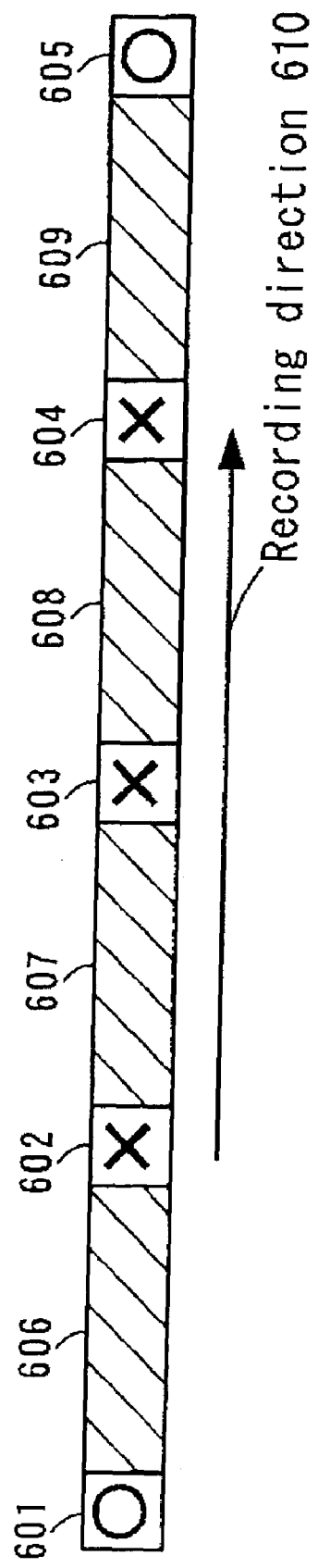
FIG. 6 shows still another state of the synchronization data piece or the first symbol when the second coded data piece is determined to represent erasure in the error correction method.

In the third example, the information reproduction apparatus 140 reproduces the first coded data piece 201 and the second coded data piece 202 using an error correction method. The structures of the first coded data piece 201 and the second coded data piece 202 shown in FIG. 2 are merely exemplary. Any codes may be used as the first error correction code and the second error correction code as long as the first error correction code has a higher degree of redundancy than that of the second error correction code.

A part of the procedure performed by the reproduction control circuit 1402 and the error correction circuit 1408 may be executed using software. The procedure performed by the erasure locator information generation program 1413 and the termination condition branching program 1414 may be executed by hardware instead of using the programs 1413 and 1414.

If all the procedures performed by the information reproduction apparatus 140 are executed by hardware, one device of hardware is required for each of the plurality of erasure locator information generation methods. This excessively enlarges the scale of the apparatus. If all the procedures performed by the information reproduction apparatus 140 are executed by software, an excessively long time is required. In the third example, the procedure of generating erasure locator information is performed by software, and other procedures are performed by hardware. Thus, erasure error correction can be performed in repetition merely by reading different programs from the program memory 1412. This can reduce the scale of the hardware and shortens the processing time. The information reproduction apparatus 140 is superior in terms of the time required for designing and costs to systems of either executing all the procedures by hardware or executing all the procedures by software.

An error correction method and a reproduction apparatus according to the present invention function as follows. When a first symbol included in a first coded data piece having a relatively high degree of redundancy is detected to have an error or when no synchronization data piece is detected, the second symbols which are provided in the vicinity of such a first symbol or the undetected synchronization data piece have a high probability of incorrect and thus are determined to represent erasure. When a synchronization data piece is detected with a positional offset, symbols included in the coded data pieces located before such a synchronization data piece have a high probability of being incorrect and thus is determined to represent erasure. Symbols included in the coded data pieces located after such a synchronization data piece have a high probability of being correct and thus is determined not to represent erasure. When at least two of the undetected synchronization data pieces and synchronization data pieces detected with a positional offset are consecutive, data pieces which are read before the next correctly detected synchronization data piece have a high probability of being incorrect. Thus, symbols included in all the coded data pieces between those consecutive synchronization data pieces are determined to represent erasure. Owing to these methods, erasure positions can be determined with higher precision, and thus the error correction capability can be improved.

An error correction method and a reproduction apparatus according to the present invention are useful for, for example, error correction of composite coded data.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A reproduction method for reproducing a composite coded data piece from a recording medium having the composite coded data piece recorded thereon, wherein:

the composite coded data piece includes a first coded data piece which is error-correction-coded using a first error correction code, a second coded data piece which is error-correction-coded using a second error correction code having a lower degree of redundancy than that of the first error correction code, and a plurality of synchronization data pieces, the first coded data piece includes a plurality of first symbols, the second coded data piece includes a plurality of second symbols, at least one first symbol is provided between two adjacent synchronization data pieces among the plurality of synchronization data pieces, and at least one of the plurality of second symbols is provided at least between a synchronization data piece and a first symbol, the reproduction method comprising:

a reading step of reading the composite coded data piece from the recording medium and outputting the first coded data piece, the second coded data piece, and the plurality of synchronization data pieces;

a synchronization detection information generation step of detecting states of the plurality of synchronization data pieces and generating synchronization detection information which represents the detection result;

an error location information generation step of performing error correction of the first coded data piece and generating error location information which represents an error location of the first coded data;

an erasure locator information generation step of generating erasure locator information which represents an erasure position of the second coded data piece, based on the error location information and the synchronization detection information; and an erasure error correction step of performing erasure error correction of the second coded data piece based on the erasure locator information, wherein the erasure locator information generation step includes the step of, when the synchronization detection information indicates that there is a synchronization data piece which is not detected and the error location information indicates that no error is detected in the first symbols immediately on both sides of the undetected synchronization data piece, determining at least one of the plurality of second symbols provided adjacent to the undetected synchronization data piece as representing erasure.

2. A reproduction method according to claim 1, wherein:

at least two first symbols are provided between two adjacent synchronization data pieces among the plurality of synchronization data pieces, at least one second symbol is provided between two adjacent first symbols among the at least two first symbols, and the erasure locator information generation step further includes the step of, when the error location information indicates that there is a first symbol detected to have an error and at least one of the error location information and the synchronization detection information indicates that one of a detected synchronization data piece and a first symbol detected to have no error is immediately on each of both sides of the first symbol detected to have an error, determining at least one of the plurality of second symbols provided adjacent to the first symbol detected to have an error as representing erasure.

3. A reproduction method for reproducing a composite coded data piece from a recording medium having the composite coded data piece recorded thereon, wherein:

the composite coded data piece includes a first coded data piece which is error-correction-coded using a first error correction code, a second coded data piece which is error-correction-coded using a second error correction code having a lower degree of redundancy than that of the first error correction code, and a plurality of synchronization data pieces, the first coded data piece includes a plurality of first symbols, the second coded data piece includes a plurality of second symbols, at least one first symbol is provided between two adjacent synchronization data pieces among the plurality of synchronization data pieces, at least one of the plurality of second symbols is provided at least between a synchronization data piece and a first symbol, and the plurality of synchronization data pieces include an Nth synchronization data piece and an (N+1)th synchronization data piece, where N is an integer, the reproduction method comprising:

a reading step of reading the composite coded data piece from the recording medium and outputting the first coded data piece, the second coded data piece, and the plurality of synchronization data pieces;

a synchronization detection information generation step of detecting states of the plurality of synchronization data pieces and generating synchronization detection information which represents the detection result;

an error location information generation step of performing error correction of the first coded data piece and generating error location information which represents an error location of the first coded data;

an erasure locator information generation step of generating erasure locator information which represents an erasure position of the second coded data piece, based on the error location information and the synchronization detection information; and an erasure error correction step of performing erasure error correction of the second coded data piece based on the erasure locator information, wherein the erasure locator information generation step includes the step of, when the synchronization detection information indicates that the (N+1)th synchronization data piece is detected with a positional offset, determining at least one second symbol provided between the Nth synchronization data piece and the (N+1)th synchronization data piece as representing erasure.

4. A reproduction method according to claim 3, wherein:

the plurality of synchronization data pieces include an (N+2)th synchronization data piece, and the erasure locator information generation step further includes the step of, when the synchronization detection information indicates that the (N+1)th synchronization data piece is detected with a positional offset, determining at least one second symbol provided between the (N+1)th synchronization data piece and the (N+2)th synchronization data piece as not representing erasure.

5. A reproduction method for reproducing a composite coded data piece from a recording medium having the composite coded data piece recorded thereon, wherein:

the composite coded data piece includes a first coded data piece which is error-correction-coded using a first error correction code, a second coded data piece which is error-correction-coded using a second error correction code having a lower degree of redundancy than that of the first error correction code, and a plurality of synchronization data pieces, the first coded data piece includes a plurality of first symbols, the second coded data piece includes a plurality of second symbols, at least one first symbol is provided between two adjacent synchronization data pieces among the plurality of synchronization data pieces, at least one of the plurality of second symbols is provided at least between a synchronization data piece and a first symbol, the plurality of synchronization data pieces include an Nth synchronization data piece and an (N+1)th synchronization data piece, where N is an integer, and a prescribed first symbol is provided between the Nth synchronization data piece and the (N+1)th synchronization data piece, the reproduction method comprising:

a reading step of reading the composite coded data piece from the recording medium and outputting the first coded data piece, the second coded data piece, and the plurality of synchronization data pieces;

a synchronization detection information generation step of detecting states of the plurality of synchronization data pieces and generating synchronization detection information which represents the detection result;

an error location information generation step of performing error correction of the first coded data piece and generating error location information which represents an error location of the first coded data;

an erasure locator information generation step of generating erasure locator information which represents an erasure position of the second coded data piece, based on the error location information and the synchronization detection information; and an erasure error correction step of performing erasure error correction of the second coded data piece based on the erasure locator information, wherein the erasure locator information generation step includes the step of, when the synchronization detection information indicates that the (N+1)th synchronization data piece is detected with a positional offset, determining at least one second symbol provided between the prescribed first symbol and the (N+1)th synchronization data piece as representing erasure.

6. A reproduction method according to claim 5, wherein:

the plurality of synchronization data pieces include an (N+2)th synchronization data piece, another prescribed first symbol is provided between the (N+1)th synchronization data piece and the (N+2)th synchronization data piece, and the erasure locator information generation step further includes the step of, when the synchronization detection information indicates that the (N+1)th synchronization data piece is detected with a positional offset, determining at least one second symbol provided between the (N+1)th synchronization data piece and the another prescribed first symbol as not representing erasure.

7. A reproduction method for reproducing a composite coded data piece from a recording medium having the composite coded data piece recorded thereon, wherein:

the composite coded data piece includes a first coded data piece which is error-correction-coded using a first error correction code, a second coded data piece which is error-correction-coded using a second error correction code having a lower degree of redundancy than that of the first error correction code, and a plurality of synchronization data pieces, the first coded data piece includes a plurality of first symbols, the second coded data piece includes a plurality of second symbols, at least one first symbol is provided between two adjacent synchronization data pieces among the plurality of synchronization data pieces, and at least one of the plurality of second symbols is provided at least between a synchronization data piece and a first symbol, the reproduction method comprising:

a reading step of reading the composite coded data piece from the recording medium and outputting the first coded data piece, the second coded data piece, and the plurality of synchronization data pieces;

a synchronization detection information generation step of detecting states of the plurality of synchronization data pieces and generating synchronization detection information which represents the detection result;

an error location information generation step of performing error correction of the first coded data piece and generating error location information which represents an error location of the first coded data;

an erasure locator information generation step of generating erasure locator information which represents an erasure position of the second coded data piece, based on the error location information and the synchronization detection information; and an erasure error correction step of performing erasure error correction of the second coded data piece based on the erasure locator information, wherein the erasure locator information generation step of, when the synchronization detection information indicates that any two or more data pieces from undetected synchronization data pieces and synchronization data pieces detected with a positional offset are consecutive, determining at least one second symbol provided between the consecutive synchronization data pieces as representing erasure.

8. A reproduction method according to claim 7, wherein the erasure locator information generation step further includes the step of determining at least one first symbol provided between the consecutive synchronization data pieces as representing erasure.

9. A reproduction method for reproducing a composite coded data piece from a recording medium having the composite coded data piece recorded thereon, wherein:

the composite coded data piece includes a first coded data piece which is error-correction-coded using a first error correction code, a second coded data piece which is error-correction-coded using a second error correction code having a lower degree of redundancy than that of the first error correction code, and a plurality of synchronization data pieces, the first coded data piece includes a plurality of first symbols, the second coded data piece includes a plurality of second symbols, at least one first symbol is provided between two adjacent synchronization data pieces among the plurality of synchronization data pieces, and at least one of the plurality of second symbols is provided at least between a synchronization data piece and a first symbol, the reproduction method comprising:

a reading step of reading the composite coded data piece from the recording medium and outputting the first coded data piece, the second coded data piece, and the plurality of synchronization data pieces;

a synchronization detection information generation step of detecting states of the plurality of synchronization data pieces and generating synchronization detection information which represents the detection result;

an error location information generation step of performing error correction of the first coded data piece and generating error location information which represents an error location of the first coded data;

an erasure locator information generation step of generating at least first erasure locator information and second erasure locator information which represent an erasure position of the second coded data piece, based on the error location information and the synchronization detection information; and an erasure error correction step of performing erasure error correction of the second coded data piece based on at least one of the first erasure locator information and the second erasure locator information, wherein the erasure error correction step includes the step of, when there is an error which cannot be corrected based on the first erasure locator information, performing erasure error correction of the second coded data piece based on the second erasure locator information.

10. A reproduction method according to claim 9, wherein: the erasure locator information generation step includes the steps of:

when all the errors can be corrected based on the first erasure locator information, generating erasure locator information for erasure error correction of another second coded data piece using an identical method as the method used for generating the first erasure locator information, and when all the errors can be corrected based on the second erasure locator information, generating erasure locator information for erasure error correction of another second coded data piece using an identical method as the method used for generating the second erasure locator information.

11. A reproduction method according to claim 9, wherein the erasure locator information generation step includes the steps of, when the synchronization detection information indicates that there is a synchronization data piece which is not detected and the error location information indicates that no error is detected in the first symbols immediately on both sides of the undetected synchronization data piece, determining at least one of the plurality of second symbols provided adjacent to the undetected synchronization data piece as representing erasure.

12. A reproduction method according to claim 9, wherein: at least two first symbols are provided between two adjacent synchronization data pieces among the plurality of synchronization data pieces, at least one second symbol is provided between two adjacent first symbols among the at least two first symbols, and the erasure locator information generation step includes the step of, when the error location information indicates that there is a first symbol detected to have an error and at least one of the error location information and the synchronization detection information indicates that one of a detected synchronization data piece and a first symbol detected to have no error is immediately on each of both sides of the first symbol detected to have an error, determining at least one of the plurality of second symbols provided adjacent to the first symbol detected to have an error as representing erasure.

13. A reproduction method according to claim 9, wherein: the plurality of synchronization data pieces include an Nth synchronization data piece and an (N+1)th synchronization data piece, where N is an integer, and the erasure locator information generation step includes the step of, when the synchronization detection information indicates that the (N+1)th synchronization data piece is detected with a positional offset, determining at least one second symbol provided between the Nth synchronization data piece and the (N+1)th synchronization data piece as representing erasure.

14. A reproduction method according to claim 9, wherein the erasure locator information generation step includes the step of, when the synchronization detection information indicates that any two or more data pieces from undetected synchronization data pieces and synchronization data pieces detected with a positional offset are consecutive, determining at least one second symbol provided between the consecutive synchronization data pieces as representing erasure.

15. A reproduction apparatus for reproducing a composite coded data piece from a recording medium having the composite coded data piece recorded thereon, wherein:

the composite coded data piece includes a first coded data piece which is error-correction-coded using a first error correction code, a second coded data piece which is error-correction-coded using a second error correction code having a lower degree of redundancy than that of the first error correction code, and a plurality of synchronization data pieces, the first coded data piece includes a plurality of first symbols, the second coded data piece includes a plurality of second symbols, at least one first symbol is provided between two adjacent synchronization data pieces among the plurality of synchronization data pieces, and at least one of the plurality of second symbols is provided at least between a synchronization data piece and a first symbol, the reproduction apparatus comprising:

a reading section for reading the composite coded data piece from the recording medium and outputting the first coded data piece, the second coded data piece, and the plurality of synchronization data pieces;

a synchronization detection information generation section for detecting states of the plurality of synchronization data pieces and generating synchronization detection information which represents the detection result;

an error location information generation section for performing error correction of the first coded data piece and generating error location information which represents an error location of the first coded data;

an erasure locator information generation section for generating erasure locator information which represents an erasure position of the second coded data piece, based on the error location information and the synchronization detection information; and an erasure error correction section for performing erasure error correction of the second coded data piece based on the erasure locator information, wherein when the synchronization detection information indicates that there is a synchronization data piece which is not detected and the error location information indicates that no error is detected in the first symbols immediately on both sides of the undetected synchronization data piece, the erasure locator information generation section determines at least one of the plurality of second symbols provided adjacent to the undetected synchronization data piece as representing erasure.

16. A reproduction apparatus according to claim 15, wherein:

at least two first symbols are provided between two adjacent synchronization data pieces among the plurality of synchronization data pieces, at least one second symbol is provided between two adjacent first symbols among the at least two first symbols, and when the error location information indicates that there is a first symbol detected to have an error and at least one of the error location information and the synchronization detection information indicates that one of a detected synchronization data piece and a first symbol detected to have no error is immediately on each of both sides of the first symbol detected to have an error, the erasure locator information generation section determines at least one of the plurality of second symbols provided adjacent to the first symbol detected to have an error as representing erasure.

17. A reproduction apparatus for reproducing a composite coded data piece from a recording medium having the composite coded data piece recorded thereon, wherein:

the composite coded data piece includes a first coded data piece which is error-correction-coded using a first error correction code, a second coded data piece which is error-correction-coded using a second error correction code having a lower degree of redundancy than that of the first error correction code, and a plurality of synchronization data pieces, the first coded data piece includes a plurality of first symbols, the second coded data piece includes a plurality of second symbols, at least one first symbol is provided between two adjacent synchronization data pieces among the plurality of synchronization data pieces, at least one of the plurality of second symbols is provided at least between a synchronization data piece and a first symbol, and the plurality of synchronization data pieces include an Nth synchronization data piece and an (N+1)th synchronization data piece, where N is an integer, the reproduction apparatus comprising:

a reading section for reading the composite coded data piece from the recording medium and outputting the first coded data piece, the second coded data piece, and the plurality of synchronization data pieces;

a synchronization detection information generation section for detecting states of the plurality of synchronization data pieces and generating synchronization detection information which represents the detection result;

an error location information generation section for performing error correction of the first coded data piece and generating error location information which represents an error location of the first coded data;

an erasure locator information generation section for generating erasure locator information which represents an erasure position of the second coded data piece, based on the error location information and the synchronization detection information; and an erasure error correction section for performing erasure error correction of the second coded data piece based on the erasure locator information, wherein when the synchronization detection information indicates that the (N+1)th synchronization data piece is detected with a positional offset, the erasure locator information generation section determines at least one second symbol provided between the Nth synchronization data piece and the (N+1)th synchronization data piece as representing erasure.

18. A reproduction apparatus according to claim 17, wherein:

the plurality of synchronization data pieces include an (N+2)th synchronization data piece, and when the synchronization detection information indicates that the (N+1)th synchronization data piece is detected with a positional offset, the erasure locator information generation section determines at least one second symbol provided between the (N+1)th synchronization data piece and the (N+2)th synchronization data piece as not representing erasure.

19. A reproduction apparatus for reproducing a composite coded data piece from a recording medium having the composite coded data piece recorded thereon, wherein:

the composite coded data piece includes a first coded data piece which is error-correction-coded using a first error correction code, a second coded data piece which is error-correction-coded using a second error correction code having a lower degree of redundancy than that of the first error correction code, and a plurality of synchronization data pieces, the first coded data piece includes a plurality of first symbols, the second coded data piece includes a plurality of second symbols, at least one first symbol is provided between two adjacent synchronization data pieces among the plurality of synchronization data pieces, at least one of the plurality of second symbols is provided at least between a synchronization data piece and a first symbol, the plurality of synchronization data pieces include an Nth synchronization data piece and an (N+1)th synchronization data piece, where N is an integer, and a prescribed first symbol is provided between the Nth synchronization data piece and the (N+1)th synchronization data piece, the reproduction apparatus comprising:

a reading section for reading the composite coded data piece from the recording medium and outputting the first coded data piece, the second coded data piece, and the plurality of synchronization data pieces;

a synchronization detection information generation section for detecting states of the plurality of synchronization data pieces and generating synchronization detection information which represents the detection result;

an error location information generation section for performing error correction of the first coded data piece and generating error location information which represents an error location of the first coded data;

an erasure locator information generation section for generating erasure locator information which represents an erasure position of the second coded data piece, based on the error location information and the synchronization detection information; and an erasure error correction section for performing erasure error correction of the second coded data piece based on the erasure locator information, wherein when the synchronization detection information indicates that the (N+1)th synchronization data piece is detected with a positional offset, the erasure locator information generation section determines at least one second symbol provided between the prescribed first symbol and the (N+1)th synchronization data piece as representing erasure.

20. A reproduction apparatus according to claim 19, wherein:

the plurality of synchronization data pieces include an (N+2)th synchronization data piece, another prescribed first symbol is provided between the (N+1)th synchronization data piece and the (N+2)th synchronization data piece, and when the synchronization detection information indicates that the (N+1)th synchronization data piece is detected with a positional offset, the erasure locator information generation section determines at least one second symbol provided between the (N+1)th synchronization data piece and the another prescribed first symbol as not representing erasure.

21. A reproduction apparatus for reproducing a composite coded data piece from a recording medium having the composite coded data piece recorded thereon, wherein:

the composite coded data piece includes a first coded data piece which is error-correction-coded using a first error correction code, a second coded data piece which is error-correction-coded using a second error correction code having a lower degree of redundancy than that of the first error correction code, and a plurality of synchronization data pieces, the first coded data piece includes a plurality of first symbols, the second coded data piece includes a plurality of second symbols, at least one first symbol is provided between two adjacent synchronization data pieces among the plurality of synchronization data pieces, and at least one of the plurality of second symbols is provided at least between a synchronization data piece and a first symbol, the reproduction apparatus comprising:

a reading section for reading the composite coded data piece from the recording medium and outputting the first coded data piece, the second coded data piece, and the plurality of synchronization data pieces;

a synchronization detection information generation section for detecting states of the plurality of synchronization data pieces and generating synchronization detection information which represents the detection result;

an error location information generation section for performing error correction of the first coded data piece and generating error location information which represents an error location of the first coded data;

an erasure locator information generation section for generating erasure locator information which represents an erasure position of the second coded data piece, based on the error location information and the synchronization detection information; and an erasure error correction section for performing erasure error correction of the second coded data piece based on the erasure locator information, wherein when the synchronization detection information indicates that any two or more data pieces from undetected synchronization data pieces and synchronization data pieces detected with a positional offset are consecutive, the erasure locator information generation section determines at least one second symbol provided between the consecutive synchronization data pieces as representing erasure.

22. A reproduction apparatus according to claim 21, wherein the erasure locator information generation section determines at least one first symbol provided between the consecutive synchronization data pieces as representing erasure.

23. A reproduction apparatus for reproducing a composite coded data piece from a recording medium having the composite coded data piece recorded thereon, wherein:

the composite coded data piece includes a first coded data piece which is error-correction-coded using a first error correction code, a second coded data piece which is error-correction-coded using a second error correction code having a lower degree of redundancy than that of the first error correction code, and a plurality of synchronization data pieces, the first coded data piece includes a plurality of first symbols, the second coded data piece includes a plurality of second symbols, at least one first symbol is provided between two adjacent synchronization data pieces among the plurality of synchronization data pieces, and at least one of the plurality of second symbols is provided at least between a synchronization data piece and a first symbol, the reproduction apparatus comprising:

a reading section for reading the composite coded data piece from the recording medium and outputting the first coded data piece, the second coded data piece, and the plurality of synchronization data pieces;

a synchronization detection information generation section for detecting states of the plurality of synchronization data pieces and generating synchronization detection information which represents the detection result;

an error location information generation section for performing error correction of the first coded data piece and generating error location information which represents an error location of the first coded data;

an erasure locator information generation section for generating at least first erasure locator information and second erasure locator information which represent an erasure position of the second coded data piece, based on the error location information and the synchronization detection information; and an erasure error correction section for performing erasure error correction of the second coded data piece based on at least one of the first erasure locator information and the second erasure locator information, wherein when there is an error which cannot be corrected based on the first erasure locator information, the erasure error correction section performs erasure error correction of the second coded data piece based on the second erasure locator information.

24. A reproduction apparatus according to claim 23, wherein:

when all the errors can be corrected based on the first erasure locator information, the erasure locator information generation section generates erasure locator information for erasure error correction of another second coded data piece using an identical method as the method used for generating the first erasure locator information, and when all the errors can be corrected based on the second erasure locator information, the erasure locator information generation section generates erasure locator information for erasure error correction of another second coded data piece using an identical method as the method used for generating the second erasure locator information.

25. A reproduction apparatus according to claim 23, wherein:

when the synchronization detection information indicates that there is a synchronization data piece which is not detected and the error location information indicates that no error is detected in the first symbols immediately on both sides of the undetected synchronization data piece, the erasure locator information generation section determines at least one of the plurality of second symbols provided adjacent to the undetected synchronization data piece as representing erasure.

26. A reproduction apparatus according to claim 23, wherein:

at least two first symbols are provided between two adjacent synchronization data pieces among the plurality of synchronization data pieces, at least one second symbol is provided between two adjacent first symbols among the at least two first symbols, and when the error location information indicates that there is a first symbol detected to have an error and at least one of the error location information and the synchronization detection information indicates that one of a detected synchronization data piece and a first symbol detected to have no error is immediately on each of both sides of the first symbol detected to have an error, the erasure locator information generation section determines at least one of the plurality of second symbols provided adjacent to the first symbol detected to have an error as representing erasure.

27. A reproduction apparatus according to claim 23, wherein:

the plurality of synchronization data pieces include an Nth synchronization data piece and an (N+1)th synchronization data piece, where N is an integer, and when the synchronization detection information indicates that the (N+1)th synchronization data piece is detected with a positional offset, the erasure locator information generation section determines at least one second symbol provided between the Nth synchronization data piece and the (N+1)th synchronization data piece as representing erasure.

28. A reproduction apparatus according to claim 23, wherein:

when the synchronization detection information indicates that any two or more data pieces from undetected synchronization data pieces and synchronization data pieces detected with a positional offset are consecutive, the erasure locator information generation section determines at least one second symbol provided between the consecutive synchronization data pieces as representing erasure.

* * * * *